United States Patent
Ryley, III

(10) Patent No.: US 10,683,924 B1
(45) Date of Patent: Jun. 16, 2020

(54) BUFFERED CAM ASSEMBLY

(71) Applicant: CBN Nano Technologies Inc., Ottawa (CA)

(72) Inventor: James F. Ryley, III, Downey, CA (US)

(73) Assignee: CBN Nano Technologies Inc., Ottawa (CA)

(*) Notice: Subject to any disclaimer, the term of this patent is extended or adjusted under 35 U.S.C. 154(b) by 0 days.

(21) Appl. No.: 16/509,550

(22) Filed: Jul. 12, 2019

(51) Int. Cl.
| *F16H 53/06* | (2006.01) |
| *G06C 15/00* | (2006.01) |
| *G06F 5/01* | (2006.01) |
| *F16H 25/14* | (2006.01) |
| *F16H 53/02* | (2006.01) |

(52) U.S. Cl.
CPC ............. *F16H 53/06* (2013.01); *F16H 25/14* (2013.01); *F16H 53/025* (2013.01); *G06C 15/00* (2013.01); *G06F 5/01* (2013.01)

(58) Field of Classification Search
CPC ........ F16H 25/14; F16H 25/16; F16H 25/183; F16H 2025/063; F16H 53/025; F16H 53/02; F16H 53/06; F16H 57/00; G06C 15/00; G06F 5/01
See application file for complete search history.

(56) References Cited

U.S. PATENT DOCUMENTS

| 3,352,167 | A | * | 11/1967 | Winters ................ G05G 7/04 74/96 |
| 4,638,772 | A | | 1/1987 | Burandt |
| 5,039,145 | A | | 8/1991 | Frye |
| 5,586,467 | A | | 12/1996 | Weber |
| 5,886,832 | A | | 3/1999 | Ihara |
| 8,807,977 | B2 | | 8/2014 | Heininger et al. |
| 10,481,866 | B2 | * | 11/2019 | Merkle ................ H01B 3/307 |
| 2012/0153641 | A1 | | 6/2012 | Watanabe |
| 2017/0192748 | A1 | | 7/2017 | Merkle et al. |
| 2020/0026490 | A1 | * | 1/2020 | Merkle ................ G06F 5/01 |

FOREIGN PATENT DOCUMENTS

| JP | 55-64227 A | 5/1980 |
| JP | 7-133859 A | 5/1985 |
| JP | 61-295916 A | 12/1986 |
| JP | 5-175695 A | 7/1993 |
| JP | 11-291451 A | 10/1999 |
| JP | 2004-332684 A | 11/2004 |

OTHER PUBLICATIONS

Merkle R., Freitas, R., et al., "Molecular Mechanical Computing Systems," 2016, Institute for Molecular Manufacturing.
Merkle R., Freitas, R., et al., "Mechanical Computing Systems Using Only Links and Rotary Joints," ASME Journal on Mechanisms and Robotics, 2018, pp. 061006, v. 10.

* cited by examiner

*Primary Examiner* — Adam D Rogers

(57) ABSTRACT

A buffered cam assembly, which is particularly well-suited for use to provide a clock input for a mechanical computing system, interposes a buffer element between a cam surface and a follower. The buffer element engages the cam surface and acts to significantly reduce the effect of any irregularities in the cam surface on the resulting motion of the follower, allowing the output waveform of movement of the follower to more closely approximate an intended ideal output waveform.

17 Claims, 13 Drawing Sheets

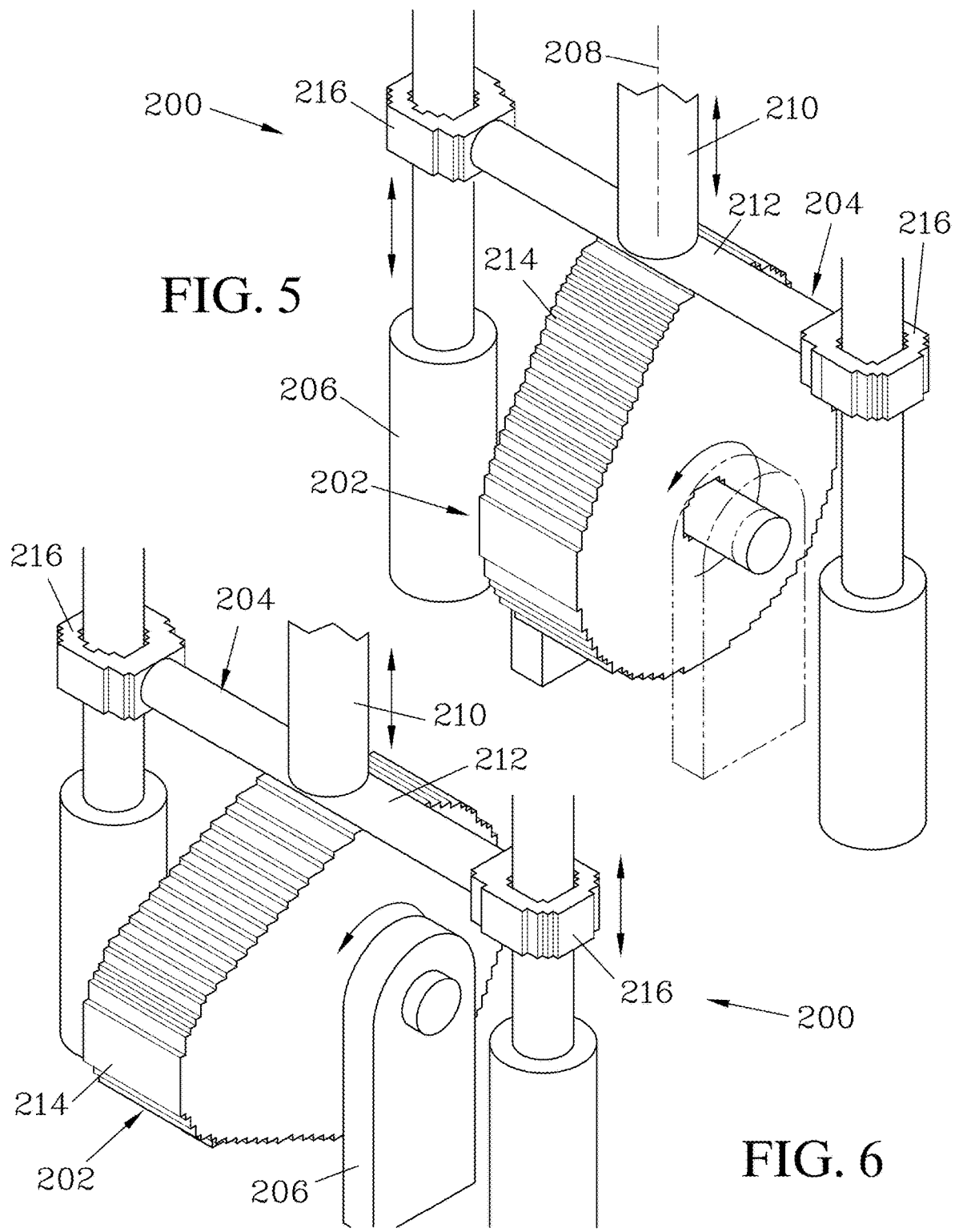

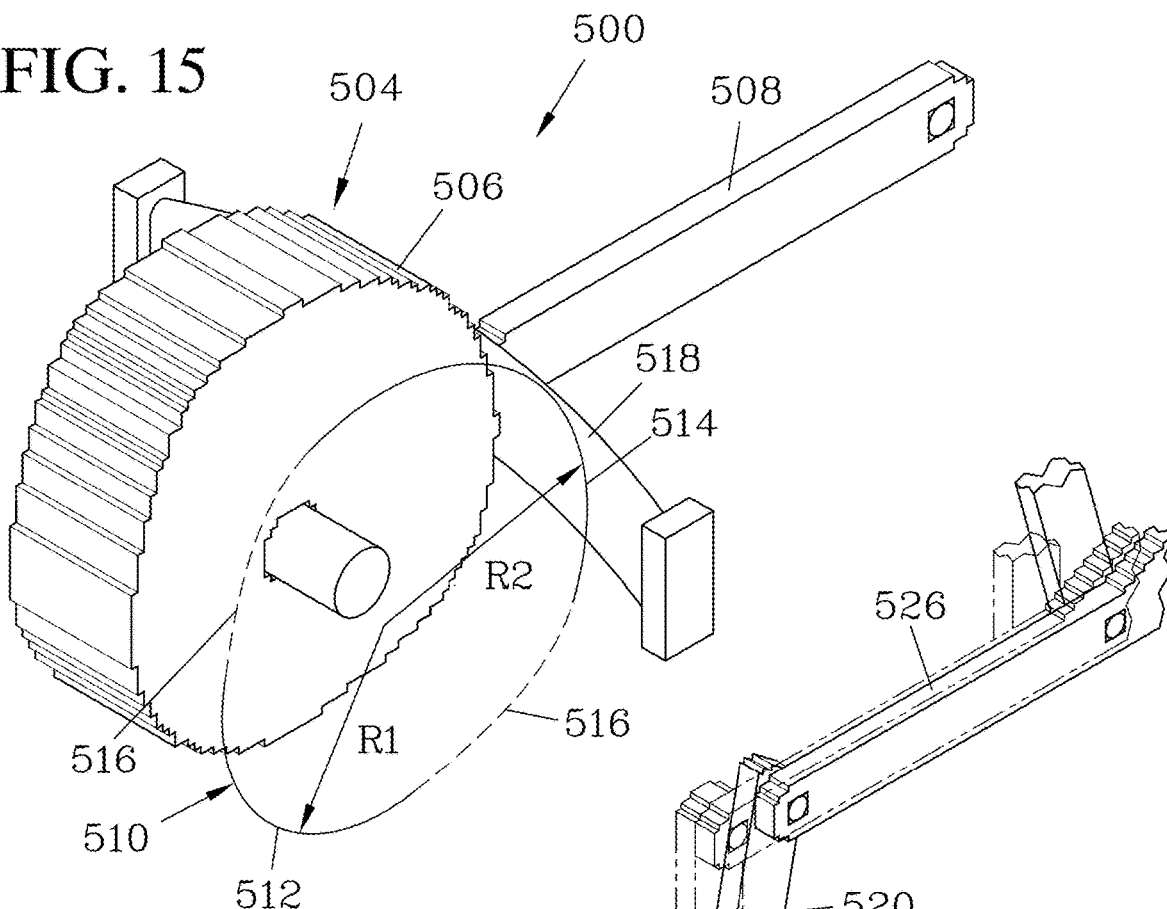
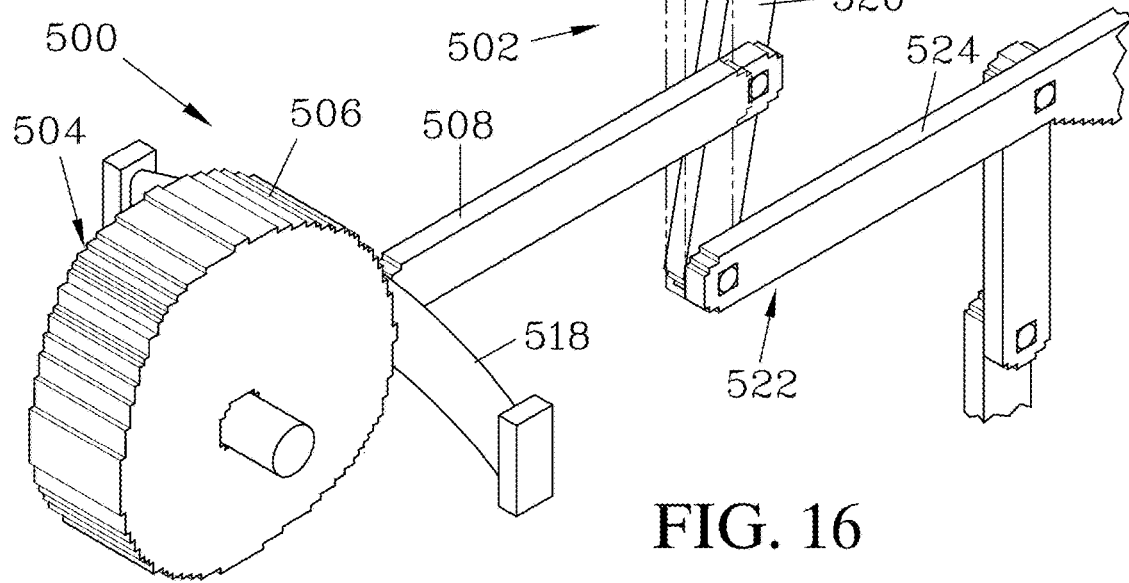

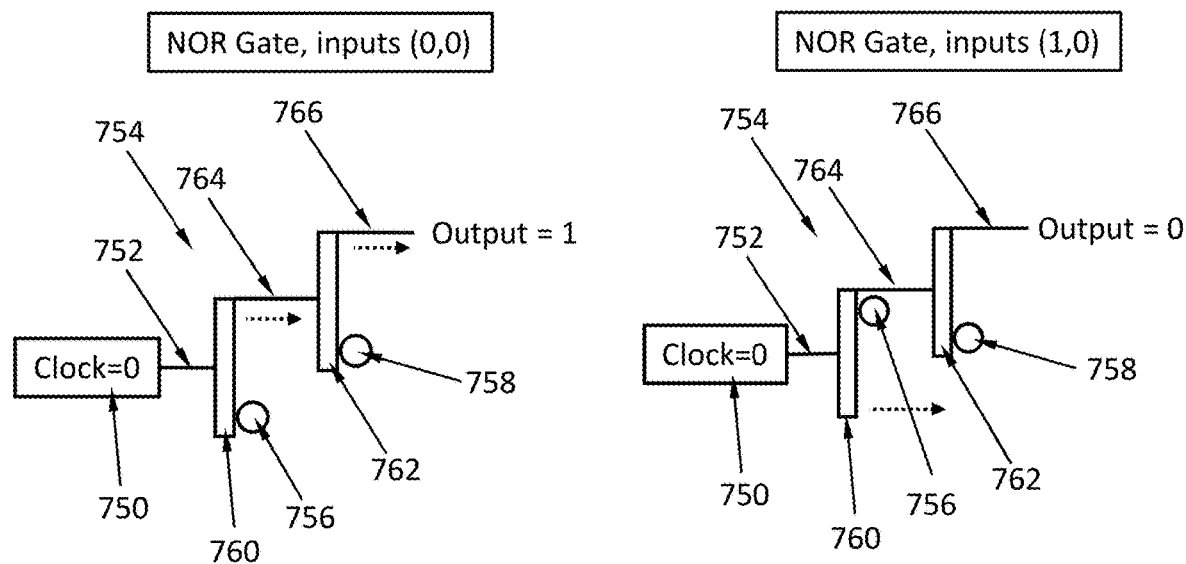
FIG. 23a
FIG. 23b
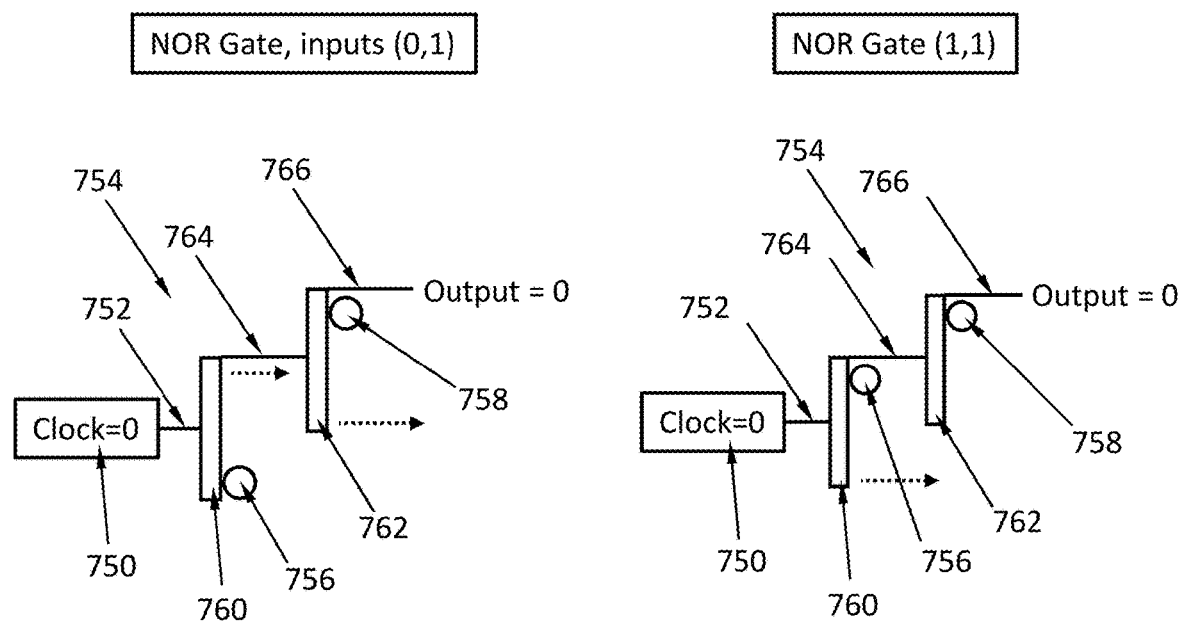
FIG. 23c
FIG. 23d

BUFFERED CAM ASSEMBLY

CROSS-REFERENCE TO RELATED APPLICATIONS

Not applicable.

FEDERALLY SPONSORED RESEARCH

Not applicable.

SEQUENCE LISTING OR PROGRAM

Not applicable.

TECHNICAL FIELD

The present application relates to cam assemblies where a moving cam has a contoured surface that displaces a follower as the cam moves, and particularly for such assemblies when used to provide a desired output waveform, such as for use as a clock signal in a mechanical computing system.

BACKGROUND

Cam assemblies are well known for converting one pattern of motion to another. In a typical example, a cam is moved relative to a frame or scaffold by a motivating input force such as a motor, and a cam surface is configured to move a follower (which is movably supported by the frame in a position so as to engage the cam surface) that tracks along the cam surface. The contour of the cam surface (which may be a surface, slot, or other structure designed to guide the motion of the follower engaged therewith) displaces the follower such that the follower produces the desired output pattern of movement. For example, a cam having an eccentric cam surface may rotate to convert rotary motion to linear motion of a follower that is displaced by the eccentric surface as the cam rotates. In many cases, a cam is employed to convert simple motion, such as constant-speed rotation or reciprocating movement, to a desired output waveform, such as a sinusoidal or trapezoidal displacement of the follower, potentially with dwell periods where the position of the follower does not change.

Various cam types are well known in the art, including rotating cams having a peripheral cam surface with a radius that varies around the circumference, rotating cylindrical cams having a cam surface with a constant radius but which varies in position in a direction orthogonal to the axis of rotation, reciprocating cams which translate back and forth along an axis, stationary cams where the cam surface remains fixed to the frame and the follower is moved relative to the cam, etc. Variations on the basic cam designs also exist. For example, most cams can be made as a conjugal cam where the follower contact portion has opposed contact points that follow opposed portions of the cam surface(s).

There are many ways to synthesize cam and follower profiles based on desired output waveforms, and such algorithms are well-known. For example, given different positions that the cam follower should assume at different times, the curves between positions on the cam surface can be determined assuming a constant velocity or constant acceleration, or the curves may be cubic, cycloidal, harmonic, trapezoidal, sinusoidal, 345-polynomial, 4567-polynomial, or any of many others. Commercial software is available to create cam profiles, for example, Analytix Cams (Saltire Software, Oregon, US) is specifically for cam design, and more general programs such as Autodesk Inventor and AutoCAD (Autodesk, California, US), have cam design and simulation features.

Issues like jerk and chatter are largely dependent on the operating speed of the cam, and one purpose of some cam profile generation algorithms is to minimize these phenomena. However, jerk and chatter aside, and even at low speeds, the accuracy of the resulting output waveform is typically dependent on the smoothness of the cam surface, since unintended variations in the cam surface may translate to noise or other unintended variations in the cam follower position. This problem is typically avoided with precise machining and other steps (e.g., polishing), which gives the cam a smooth surface, but which also increase the expense and effort of fabrication.

SUMMARY

Inaccurate output waveforms resulting from irregularities (in which we include any deviation from the ideal contour) of the cam surface is particularly a concern for fabricating cam assemblies using small-scale techniques such as micromachining, micro- and nano-lithography, molecular fabrication by mechanosynthesis, etc., and for cases where manufacturing precision may be limited (e.g., 3D printing with relatively large layers and/or tolerances). In such cases, the minimum feature size that can be machined or additively manufactured places a lower limit on both the accuracy of the output waveform (and thus the magnitude of cam follower movement that can be effectively discriminated), and the minimum size of cam assembly that can be manufactured.

For almost any cam, the actual cam surface only approximates the idealized surface or contour. In some cases, the deviations of the actual contour from the idealized contour will be insignificant to cam operation. However, in other cases, for example, where the cam surface is relatively irregular (perhaps due to being produced with less than state of the art equipment, or via a technique such as 3D printing that can have a large minimum feature size), the deviations from ideal can cause problems in operation. These problems can include chatter, jitter, heat, and wear. Also, it should be noted that smaller cams will tend to tolerate less absolute (as opposed to relative) deviation between the actual contour and the idealized contour. For example, in a typical macroscopic cam, variations from ideal of 0.01 mm or even 0.1 mm or more might be tolerable. However, consider a cam produced via MEMS ("micro-electromechanical systems") or NEMS techniques (e.g., lithography), or other technologies where the entire cam is less than 0.01 mm or 0.1 mm across. Clearly such a cam cannot tolerate deviations from ideal that are larger than the entire cam. So, it is reasonable to say that at least in some situations, it is not the absolute size of the deviations that matter so much as it is the ratio of the deviations to the cam's size. With molecular-scale cams, it may be impossible to have the cam's actual contour closely approximate the ideal contour because individual atoms may be large enough to cause substantial deviations from ideal. These irregularities on the cam surface can cause irregularities in the desired movement or waveform of the cam follower.

Just like acceptable irregularities in the cam surface may be relative to the size of the cam, waveform irregularities (meaning deviations in the waveform produced versus the ideal waveform desired; the smaller the deviations the more accurate, and most often smooth, the waveform) can be viewed in light of the desired magnitude of the output waveform and other operating characteristics of the mechanisms (e.g., the mass, flexibility, and compressibility of the materials used in the cam assembly and that which is being driven by the cam assembly, the speed of operation, and the amount of drag, can all affect cam behavior). For example, if the overall magnitude (or, for a cam with more than simply a low and high position, the smallest difference between two positions of the cam follower which are desired to be discreet), is on the order of Angstroms or nanometers, individual atoms on the cam surface can cause enough irregularity that, relative to the overall magnitude, substantial inaccuracies are present in the output waveform.

The output waveform from a follower engaging an irregular cam surface would typically be inaccurate in some way, whether the inaccuracies consist of random variations, periodic spikes or vibrations, or other noise-related effects. This does not mean that, overall, the cam is not generating, in terms of the rough overall shape, the correct waveform (although that is possible), but rather what is more likely is that the rough overall desired output waveform is produced but with higher frequency noise superimposed on the overall waveform, causing inaccuracies. Inaccurate waveforms can create undesirable vibrations in machines employing such cam assemblies, creating unwanted noise, excessive heat and wear, inaccurate positioning of the cam follower, and other problems. If a cam assembly is designed to provide a clock signal for a mechanical computing mechanism (or system, either of which can encompass single logic elements, memory storage elements for any number of bits, or combinations thereof, up to and including a complete computer, including systems where only some parts are mechanical), such as those taught in U.S. Publication 2017/0192748 (Merkle, Freitas et al., "Mechanical Computing Systems," US Patent Application 20170192748, 2015), incorporated herein by reference, an inaccurate waveform may cause vibrations that stress parts, create heat, and in the extreme case, could result in unwanted changes of state that introduce errors into the computation (for example, by noise pushing the cam follower into a "1" or actuated position, when it should be in a "0" or unactuated position, or vice versa, or by adopting a position somewhere in between 0 and 1 at a time when such a position should not be allowed).

The output waveform of a cam and cam follower can be made more accurate by interposing a buffer element between the cam surface and a follower contact portion of a follower. Note that the buffer element could be separate from, affixed to, or integral with, the follower. The follower contact portion is the part of the follower that is displaced by the relative motion of the cam surface (for purposes of discussion, it is assumed in the following descriptions that the cam is moving relative to a frame so as to move the cam surface relative to the follower contact portion). The buffer element can increase the accuracy with which the cam follower produces the desired movement by multiple mechanisms, including the buffer reducing (e.g., via bridging or averaging irregularities on the cam's surface) deviations from ideal on the cam surface before they reach the cam follower, and/or by isolating the cam follower from (or bracing it against) shear forces created by tangential movement of the cam.

With respect to the geometry of cam assemblies and their relative movement, when referring to isolating the cam follower from shear forces, or restraining the buffer element from movement in the direction of movement of the cam surface, what is meant is that while the buffer element should be free to move in a direction that transmits the desired displacement to the cam follower, it should not be free to pulled along with the rotation or translation of the cam. Rather, it should be fairly, or completely, fixed in the axis along which the cam moves (or for a rotary cam, the axis which is tangent to the portion of the cam which contacts the buffer element, and along the cam surface's direction of movement). While some movement of the buffer element in the direction of the cam surface movement may be unavoidable, or harmless, with respect to shear (averaging benefits would still be present), if the buffer element is free to move in the direction of cam surface movement, the buffer element may not be substantially reducing shear, which is generally preferable. So, while no absolute amounts of movement or velocities can be given since they could vary with each application, the point is for the buffer element to be stabilized enough against movement in the direction of the cam surface movement that it at least reduces, if not eliminates, shear forces that would be present if the cam surface and follower were in direct contact. At least a 50% reduction in shear would be preferable and considered a significant reduction, while at least a 90% reduction in shear would be more preferable, and at least a 95% reduction in shear would be most preferable.

The buffer element may be flexible or rigid, elastic or non-elastic, and compressible or non-compressible. Different areas of the buffer element may have different compositions, and the material(s) could also behave differently in different directions (which is to say, it could be anisotropic). Various exemplary configurations are described herein, but many more should be evident to one skilled in the art based on the teachings herein.

Different material properties may affect many aspects of cam assembly function. For example, the level of rigidity or flexibility of the buffer element may be one factor that affects how much buffer element surface area is in contact with the cam and cam follower, which may affect the buffer's ability to average positions on the cam surface, and may also affect drag, supportable load, heat transfer, wear rate, etc.

In terms of configurations, a flexible buffer element may be able to conform to the contour of the cam surface, transmitting motion to the follower that is closer to the ideal contour than the cam surface itself. A flexible buffer element could be either rigidly or movably held relative to the frame to which the cam is movably mounted. A rigid buffer element will tend to require a moveable mounting structure (e.g., linear rails, or rotary bearings, depending on the design) so that the rigid buffer element can move to track the contour of the cam surface, while remaining in place interposed between the cam surface and the follower contact portion.

The buffer element can be formed (either entirely or partially) of an elastic material and/or can be elastically mounted to the frame. The buffer element can be (either entirely or partially) compressible to average, and thereby reduce, irregularities in the cam surface, providing an effective spatial and/or temporal smoothing of such irregularities and thus a better approximation of the ideal contour.

The buffer element can serve as a replaceable wear element between the cam surface and the follower contact portion of the follower. By wearing preferentially, the buffer element is worn by the cam surface as the cam moves. This enables replacement of a buffer element, which is potentially preferable to having to replace the cam and/or cam follower.

The examples discussed herein focus on two of the most common types of cams, linear reciprocating cams and radial cams. However, there are many kinds of cams, including barrel cams, conjugate cams, stationary cams (which, for this application, preferably the buffer would then move with the follower, so as to remain largely stationary with respect to the follower except in the normal direction), and more. It will be clear to one skilled in the art from the examples and teachings herein how to apply the principles of the invention to any appropriate type of cam.

In one application of use, the cam assembly provides a clock signal for a mechanical computing mechanism or system. In such cases, the follower is connected to one or more logic circuits to move one or more clock inputs. In a typical computing application, the follower moves a clock input (which could be integrated with the follower in some cases) between two positions, with a period of time ("dwell time") at each position. It will be obvious, given the teachings herein, that the clock input could have more than two positions, that there could be multiple identical or different dwell periods, that there could be no dwell period at all, and that such a system could have multiple clocks, operating synchronously or asynchronously, and potentially with various numbers of phases per clock.

Note that the exemplary cams described and depicted herein generally show the cam follower contact element perpendicular to the cam face. While this is a common arrangement, it is not a necessary one, and any appropriate orientation of the cam follower contact element relative to the cam face (and buffer element) could be used.

BRIEF DESCRIPTION OF THE FIGURES

FIG. 1 illustrates the cam assembly when the cam is positioned to displace the follower to a maximum height position, while FIG. 2 illustrates the assembly when the cam is positioned to displace the follower to a minimum height position. Flexibility of the buffer element allows a buffer active region, which is interposed between the cam surface and the follower, to move with the cam surface. The buffer element in turn is supported by blocks that are affixed with respect to a frame (not shown) to which the cam is translatably mounted.

FIGS. 5 and 6 illustrate a cam assembly that employs a similar cam and follower to the assembly shown in FIGS. 3 & 4, but which employs a rigid buffer element that is translatably mounted to a frame so as to be free to move in the direction of the displacement of the follower. Because the buffer element is restrained to only motion perpendicular to the direction of movement of the rotating cam surface, it can isolate the follower from shear forces.

FIGS. 15 and 16 illustrate a cam assembly that is employed to generate a clock signal for a mechanical computing mechanism. The cam in this example is designed to provide a waveform with dwell periods, and thus has a cam surface where two different segments of the cam have two different, but static radii, which are connected by transition segments. This configuration acts to move the follower between two different positions, with a dwell period at each defined by the length of arc of the corresponding radius. A flexible buffer element is interposed between the cam surface and the follower. The follower is in turn connected to a balance of a lock-and-balance structure that forms a part of a logic circuit.

FIGS. 23a to 23d illustrate an example of a buffered cam assembly that provides a clock input for a mechanical link logic gate; a two-input NOR gate is illustrated. The figures show the four possible input positions and the resulting output.

DETAILED DESCRIPTION

Figure 1:
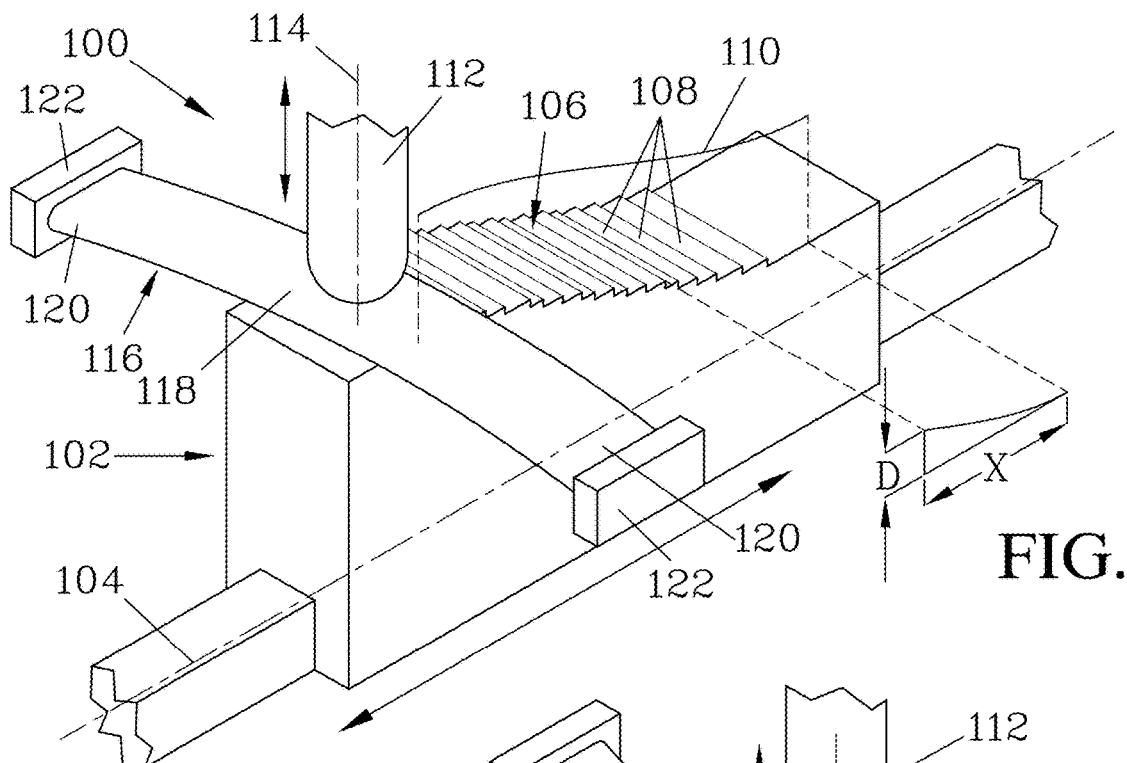
FIGS. 1 and 2 illustrate a cam assembly that employs a reciprocating cam that translates back-and-forth along an axis of motion. The cam has a contoured cam surface that is contacted by a flexible buffer, which in turn acts to displace a follower that translates in a direction perpendicular to the motion of the cam.
Figure 2:
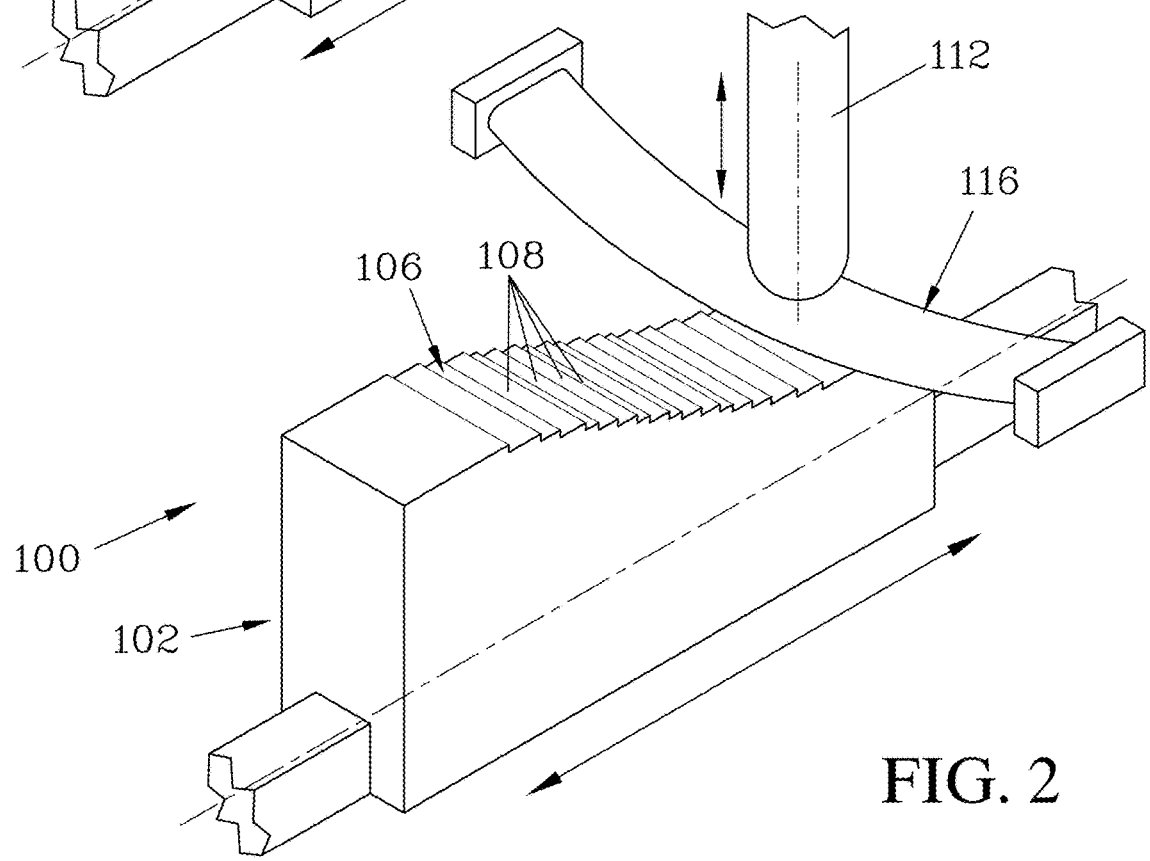

FIGS. 1 and 2 illustrate one example of a cam assembly 100, employing a linear reciprocating cam 102 that translates relative to a frame (not shown) along a cam translation axis 104. The cam 102 has a cam surface 106 that is not smooth, having steps 108. Steps 108 result from the fabrication process, and could be formed e.g., by the application of individual layers of material during an additive manufacturing process. Steps 108 may also be the result of a machining or etching processes that remove material in layers, or at the molecular scale, could represent the bumps of individual atoms. The well-defined and laterally-uniform representation of steps 108 (and steps in subsequent figures) is diagrammatic only. Steps could be irregular, randomly or periodically, in any direction. The size of the steps 108 is exaggerated in the figures for purposes of illustration. The steps 108 roughly conform to an idealized surface contour 110 that is selected to provide the desired output motion of a follower contact portion 112.

The follower contact portion 112 is movably mounted to the frame so as to move primarily along a follower axis 114, which in the assembly 100 is normal to the cam translation axis 104 (throughout the descriptions provided herein, elements are frequently described as being normal or orthogonal in the examples; one skilled in the art should appreciate that in many cases, such orthogonality is not necessary, and that analogous arrangements could be employed without elements arranged orthogonally with respect to each other). The follower contact portion 112 is biased (if appropriate; as mentioned herein, not all designs require a bias and this caveat applies to all mentions of bias herein) downwards toward the cam surface 106, by spring force, gravity, magnetic attraction, electrostatic attraction, or other means known to those skilled in the art. In some cases, such as a conjugate cam, no bias is needed. Another example would be when the mechanism to which the cam follower is attached naturally undergoes the same motion made by the cam follower. In such a case, the "bias," if it can be called that, would just be drag: the cam would run at a constant speed (e.g., due to being powered by a motor). The cam follower and its attached mechanisms would tend to slow down due to drag, keeping the cam follower in contact with the cam (even if only very lightly).

A buffer element 116 is interposed between the cam surface 106 and the follower contact portion 112. The buffer element 116 shown is flexible, and has a buffer active region 118 that engages the cam surface 106, bracketed by buffer end regions 120 that in turn are mounted to buffer braces 122 that are fixed with respect to the frame.

As the cam 102 moves, the contour 110 of the cam surface 106 causes its local position along the follower axis 114 to change. The change in position moves the buffer active region 118, which transmits this movement to the follower contact portion 112, causing the follower contact portion 112 to be displaced along the follower axis 114. Because the buffer active region 118 spans several steps 108 and at least the cam follower-facing side of active region 118 does not conform to steps 108, it serves to mechanically average the steps 108 and moves the follower contact portion 112 according to changes more like the idealized contour 110, rather than responding to the abrupt changes caused as each step 108 passes through the follower axis 114.

A variety of contours could be employed for the cam surface 106, depending on the desired movement of the follower contact portion 112 responsive to movement of the cam 102. In the example illustrated, the contour 110 is selected to provide a generally sinusoidal displacement D of the follower contact portion 112 relative to the linear displacement X of the cam 102. The idealized contour 110 shown is configured with a maximum slope D/X less than one (i.e., the contour 110 is selected such that its slope defined by instantaneous 4DL4X does not exceed 1 at any location on the cam surface). Such a limit on the maximum slope can be useful since steep slopes increase the ratio of sheer force to normal force. However, there is no particular cutoff for slope and cams may employ a contour having portions with slopes greater than 1 if appropriate for a given application.

Figure 3:
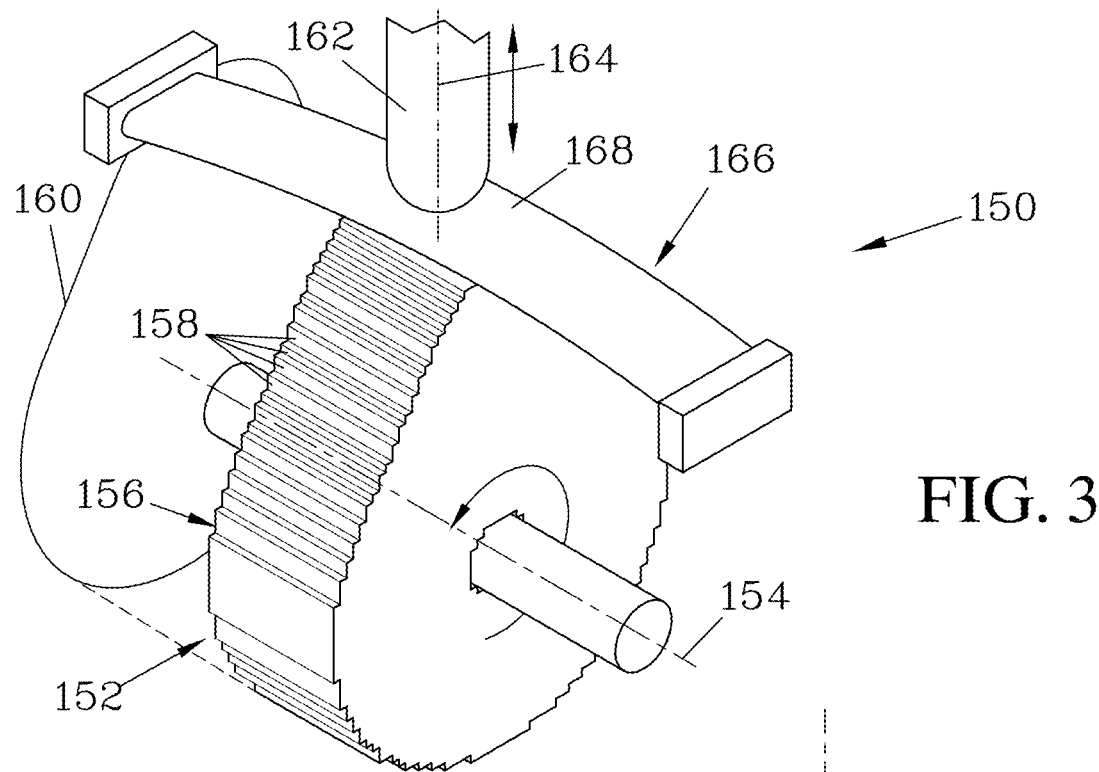
FIGS. 3 and 4 illustrate a cam assembly which may provide a similar output waveform as that of FIGS. 1 and 2, but which employs a radial cam that is rotatably mounted to a frame.
Figure 4:
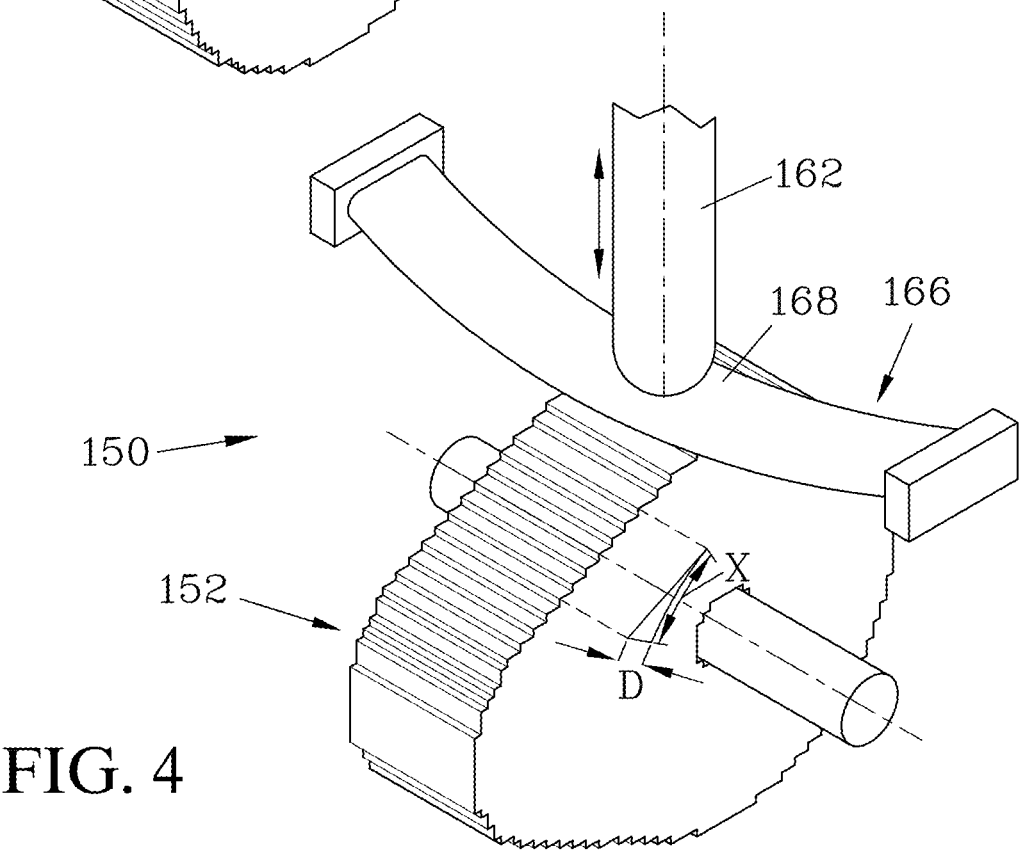

FIGS. 3 and 4 illustrate a cam assembly 150 which employs a rotating cam 152, which rotates about a cam axis 154. Again, the cam 152 has a cam surface 156 with steps 158, which roughly conform to an idealized contour 160. A follower contact portion 162 is positioned to move along a follower axis 164 responsive to changes position resulting from the contour 160 as the cam surface 156 rotates, the contour 160 having been selected to provide the desired motion of the follower contact portion 162.

The assembly 150 has a flexible buffer element 166 with a buffer active region 168 that is interposed between the cam surface 156 and the follower contact portion 162, and serves to span a number of steps 158 to allow the follower contact portion 162 to be displaced according to changes in position more similar to the idealized contour 160, rather than following the abrupt changes in position of the individual steps 158. As indicated in FIG. 4, the contour 160 of the example of the cam 152 illustrated is selected to provide a desired radial displacement D, transmitted via the buffer active region 168 to the follower contact portion 162, relative to a circumferential displacement X resulting from rotation of the cam surface 156. In the assembly 150, the contour 160 is selected such that the maximum slope $\Delta D/\Delta X$ of the contour 160 is less than one.

FIGS. 5 and 6 illustrate a cam assembly 200 that employs a cam 202 that is similar to the cam 152 shown in FIGS. 3 & 4. The assembly 200 employs a rigid buffer element 204 that is translatably mounted to a frame 206 so as to be free to translate along a follower axis 208. A follower contact portion 210, which is biased into contact with the buffer element 204, also moves along the follower axis 208. The buffer element 204 has a buffer active region 212, which engages the follower contact portion 210 and a cam surface 214 and is interposed therebetween. The buffer active region 212 is bracketed by buffer end regions 216 that each translatably engages a portion of the frame 206.

Because the buffer element 204 is restrained to only motion perpendicular (in this example; inclined translation could be employed) to the direction of movement of the rotating cam surface 214, it isolates the follower contact portion 210 from shear forces caused by motion of the cam surface 214. It should be appreciated that alternative structures and arrangements could be employed to restrain the buffer active region from moving in the direction that the cam surface moves (i.e., the movement of the entire cam surface due to motion or relative motion of the cam, such as provided by rotation or translation of the cam, as distinguished from the local changes in displacement of the cam surface at the location of the buffer active region that results from the contour of the cam surface), in order to reduce transmission of shear forces to the follower contact portion. In the assembly 200, the buffer active region 212 is restrained essentially to only motion in the same direction that the follower contact portion 210 moves (although one skilled in the art should appreciate that a negligible degree of off-axis motion may be inherently allowed due to the tolerances that are frequently necessary to avoid binding); however, less constrained movement of the buffer can still provide a useful degree of restraint, so long as the motion of the buffer active region is sufficiently limited as to avoid transfer of a significant portion of the shear forces to isolate the follower contact portion from such forces.

The ability to employ a rigid buffer element 204 has multiple advantages and disadvantages, as will be clear from the teachings herein. For example, an advantage to using a buffer element that does not conform to the cam surface is that, at least with some geometries (e.g., a convex buffer element with either a convex cam, or a concave cam or cam regions having a radius of curvature greater than that of the convex buffer element), the buffer element only makes line or point contact with the cam, which may reduce drag. A disadvantage to such a scenario is that all force between the cam and cam follower is concentrated onto a small region of the buffer element, which may cause premature wear or failure.

Figure 7:
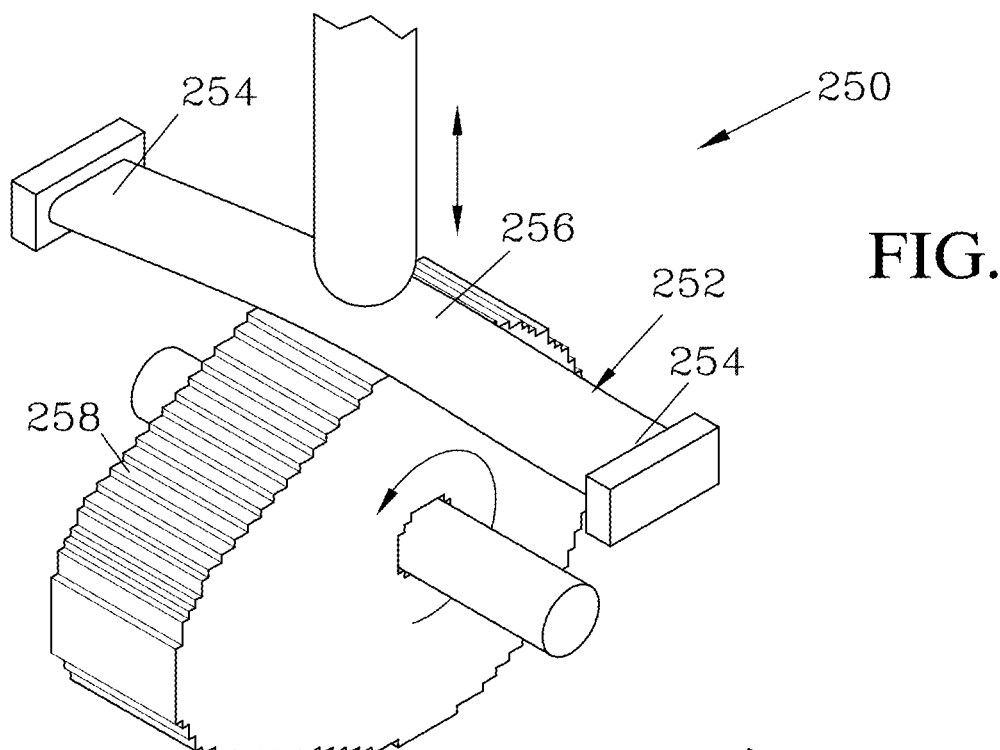
FIGS. 7 and 8 illustrate a cam assembly similar to that shown in FIGS. 3 & 4, but where the buffer element is resilient (elastic) and stretches to accommodate changes in displacement caused by the contour of the cam surface.
Figure 8:
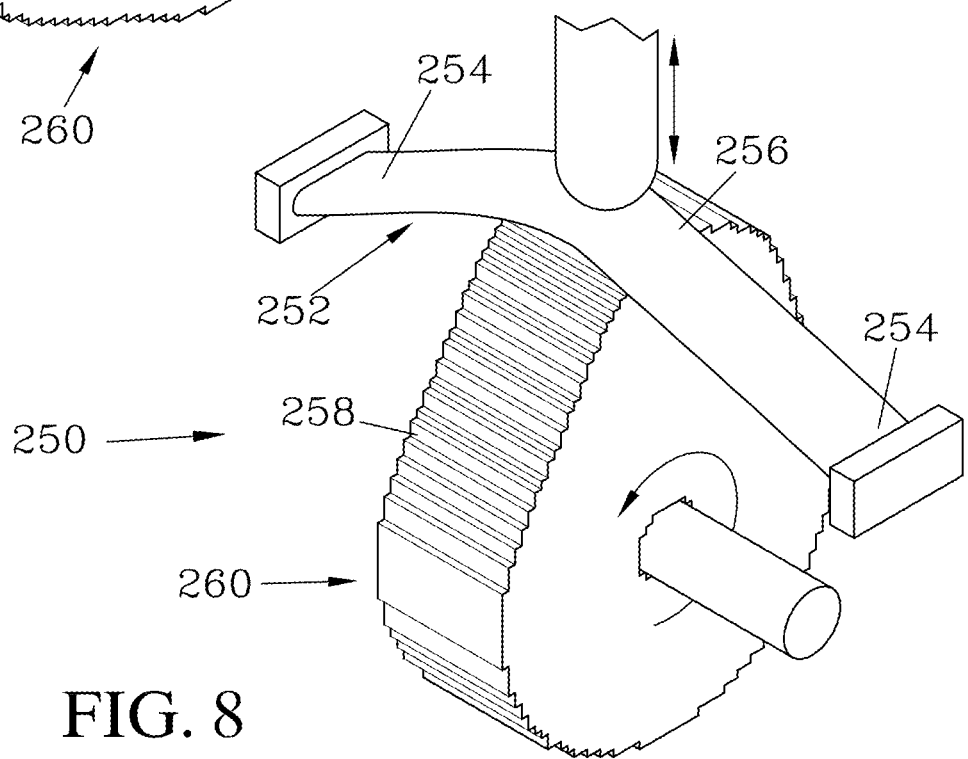

FIGS. 7 and 8 illustrate a cam assembly 250 which is similar to the assembly 150 shown in FIGS. 3 & 4 but which employs a buffer element 252 that is elastic. The buffer element 252 has end regions 254 that are fixed to a frame and stretches to allow a buffer active region 256 to accommodate changes in the local displacement of a cam surface 258 as a cam 260 rotates. The use of an elastic buffer element 252 helps assure that the buffer active region 256 remains in contact with the cam surface 258. Note that it is possible that the elastic deformation of the buffer element 252 may cause undesirable resistance to rotation of the cam 260, and in high-speed applications may cause undesirable energy losses due to heating as the buffer element 252 is rapidly stretched and contracted, and/or due to the force with which the buffer element 252 is pulled against the cam surface 258, since drag is frequently proportional to normal force. That being said, many implementations are described herein, and it will be evident to one skilled in the art given the teachings herein which designs and/or features may be well-suited to a given purpose.

Figure 9:
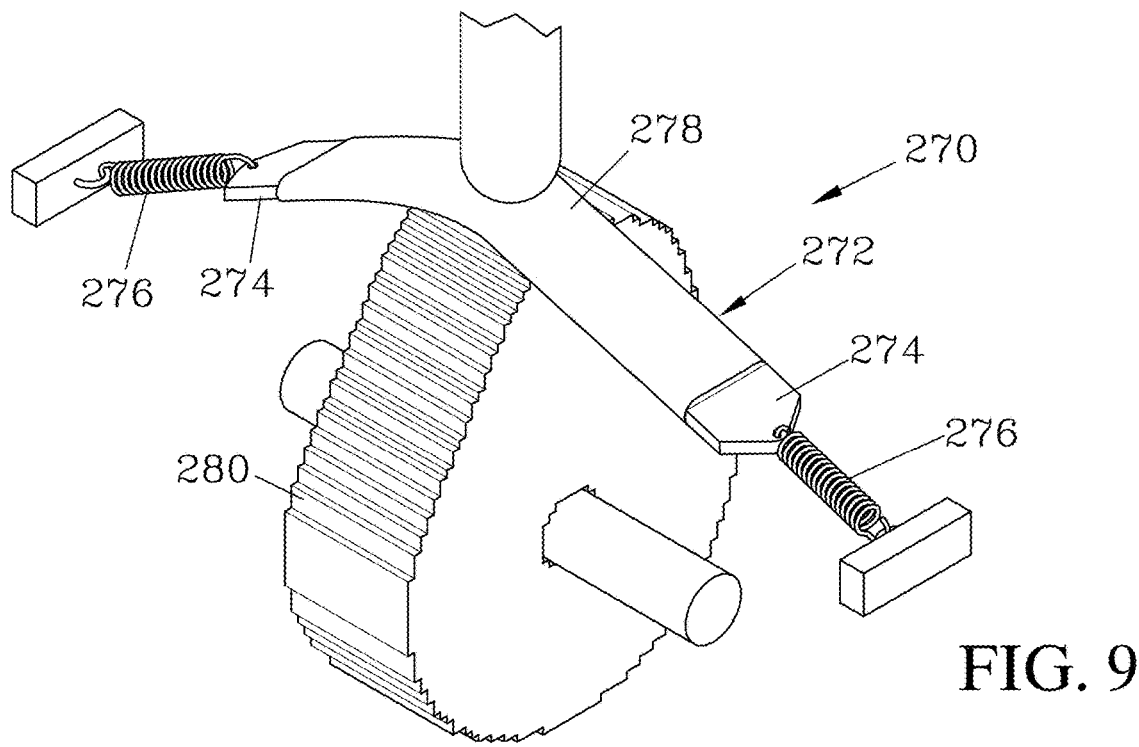
FIG. 9 illustrates a cam assembly similar to that shown in FIGS. 7 & 8, but where a flexible, inelastic buffer element is elastically mounted to a frame.

FIG. 9 illustrates a cam assembly 270 that provides a similar response to that of the assembly 250 shown in FIGS. 7 & 8, but which employs a flexible, inelastic buffer element 272. In the assembly 270, buffer end regions 274 are each elastically mounted to a frame by springs 276, assuring contact between a buffer active region 278 and a cam surface 280, but without requiring the buffer element 272 to be fabricated from an elastic material or to be moveably mounted. Note that this does not imply that springs are mutually exclusive with elastic materials, or with a moveable mount. Many combinations, of all design choices, not just springs, are possible, and in some cases desirable. For example, the use of springs together with a buffer element that is mounted translatably could provide useful tension (e.g., when the buffer element would be too flexible without tension), while not having that tension impede movement of the cam since the buffer element can translate as the cam moves. It should also be appreciated that coil springs 276 are shown in FIG. 9 solely for purposes of conceptual illustration, and other forms of springs or other elastic elements may be more practical for many applications.

Figure 10:
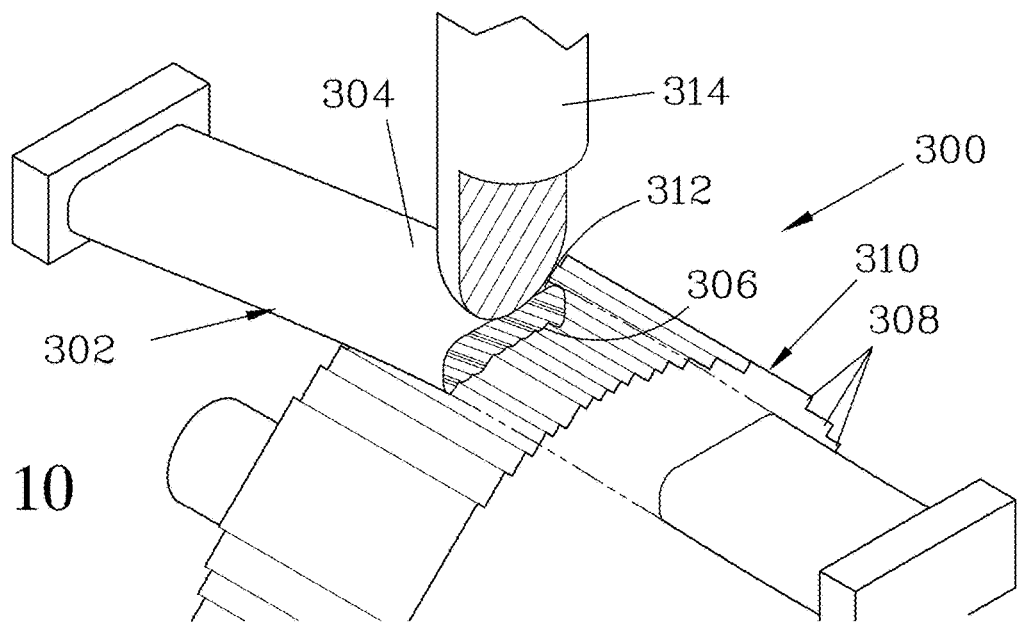
FIG. 10 illustrates a cam assembly that employs a compressible buffer element that can compress to partially conform to irregularities on a cam surface.

FIG. 10 illustrates a cam assembly 300 that employs a buffer element 302 having a buffer active region 304 that is formed from a compressible material. The use of a compressible material allows a buffer first surface 306 of the buffer active region 304 to partially conform to a number of steps 308 on a cam surface 310, effectively absorbing and/or averaging the changes in position caused by the steps 308 as the cam surface 310 moves. Thus, these instantaneous changes in position not transmitted directly to a buffer second surface 312, which is engaged by a follower contact portion 314. Rather, the compressibility of buffer active region 304 can serve to average the position of multiple steps 308 on the cam surface 310. This averaging effect can serve to attain an output waveform closer to the idealized waveform.

One advantage of smooth waveforms is lack of vibration. Many compressible materials (e.g., those with viscoelastic properties) or devices (e.g., pneumatic shocks) can also help reduce vibration by providing a damping effect across a wide range of frequencies, although that may often not be desirable if it leads to excess heat generation, excess wear of the buffer element, or other negative effects. Springs and other mechanisms can also provide vibration damping, often with less energy dissipation, but may need to be tuned for particular frequencies.

Figure 11:
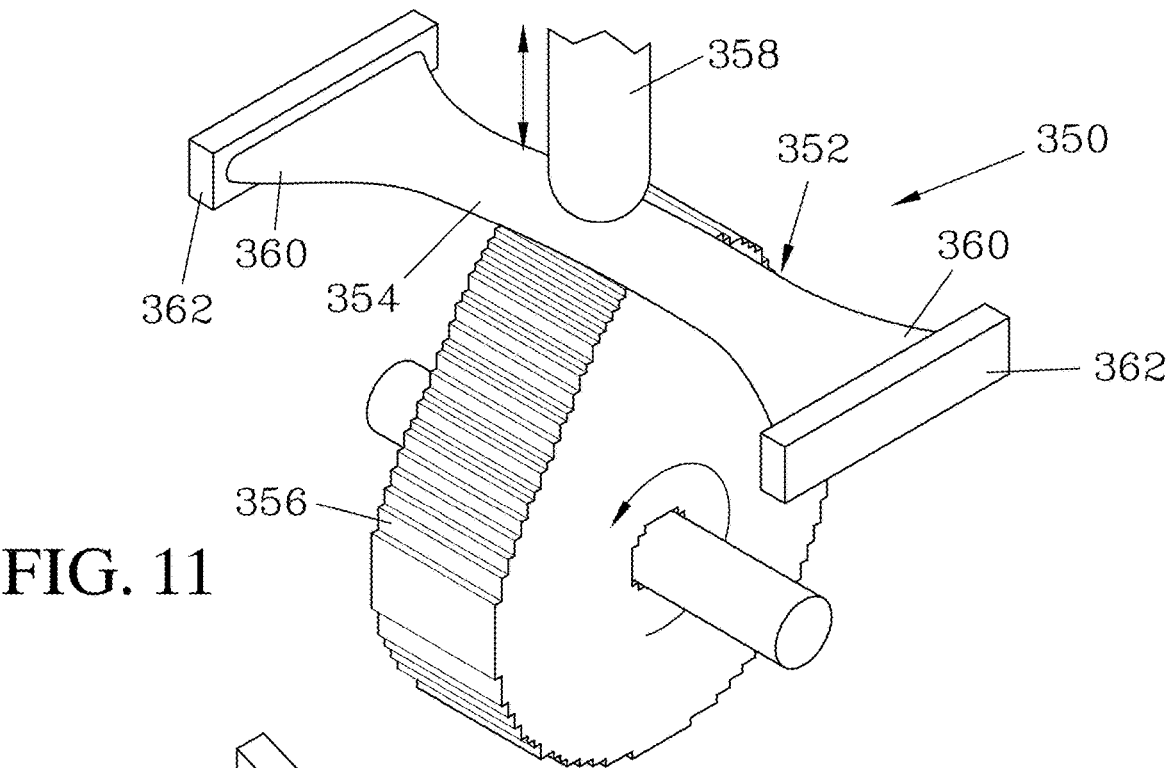
FIG. 11 illustrates a cam assembly similar to that shown in FIGS. 3 & 4, but where end regions of the buffer element are enlarged to better stabilize the buffer element against shear forces caused by movement of the cam surface.

FIG. 11 illustrates a cam assembly 350 that is similar to the assembly 150 shown in FIGS. 3 & 4, but which employs a buffer element 352 that is designed to provide greater stability against shear forces for a given buffer element material. This is generally more of an issue with more elastic or flexible buffer materials (in the direction of the shear forces) and higher shear forces. The buffer element 352 has a buffer active region 354 that engages a cam surface 356 and a follower contact portion 358, and has end regions 360 that mount to braces 362 that are fixed to a frame. The end regions 360 are extended in the direction of movement of the cam surface 356, and thus provide greater resistance to motion of the buffer active region 354 with the cam surface 356. The increased stability serves to help maintain the buffer active region 354 in position and to isolate the follower contact portion 358 from shear forces.

Figure 12:
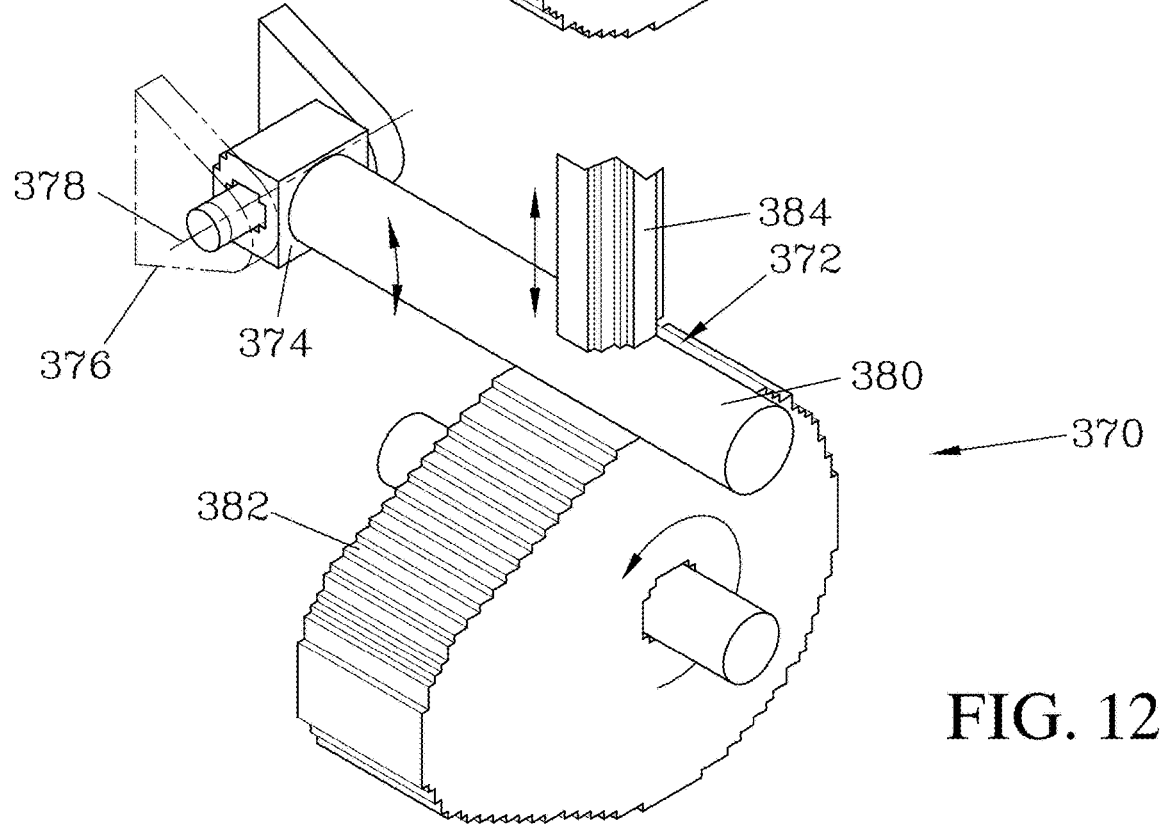
FIG. 12 illustrates a cam assembly with a rigid buffer element that is pivotably mounted to a frame.

FIG. 12 illustrates a cam assembly 370 that employs a rigid buffer element 372, in a manner similar to the assembly 200 shown in FIGS. 5 & 6. However, the buffer element 372 has a buffer end region 374 that is pivotably mounted to a frame 376, rather than being translatably mounted. The buffer element 372 can pivot about a buffer pivot axis 378 to allow a buffer active region 380 to be displaced by a cam surface 382, and the buffer active region 380 transmits this displacement to follower contact portion 384. The motion of the buffer element 372 is essentially limited (ignoring negligible free play resulting from tolerances) to pivoting in a plane that is orthogonal or substantially inclined with respect to the cam surface 382 at the location where the buffer active region 380 engages the cam surface 382. This limitation on the motion acts to restrain the buffer active region 380 from moving in the direction that the cam surface 382 moves, and thus serves to isolate the follower contact portion 384 from shear forces caused by the rotating motion of the cam surface 382.

Figure 13:
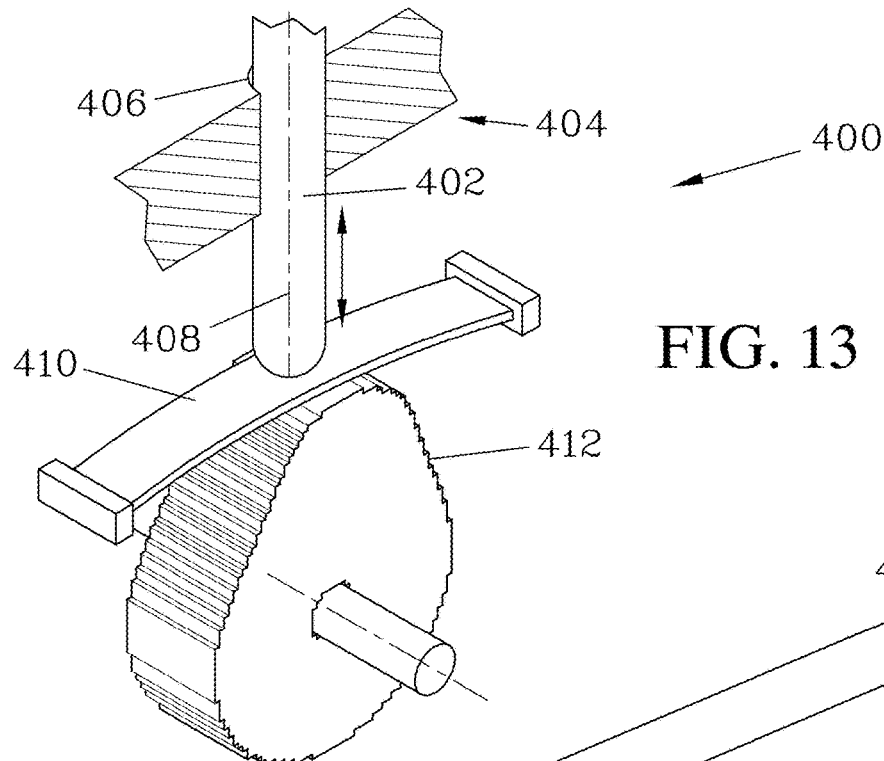
FIG. 13 illustrates a cam assembly having a follower that is translatably mounted to the frame.
Figure 14:
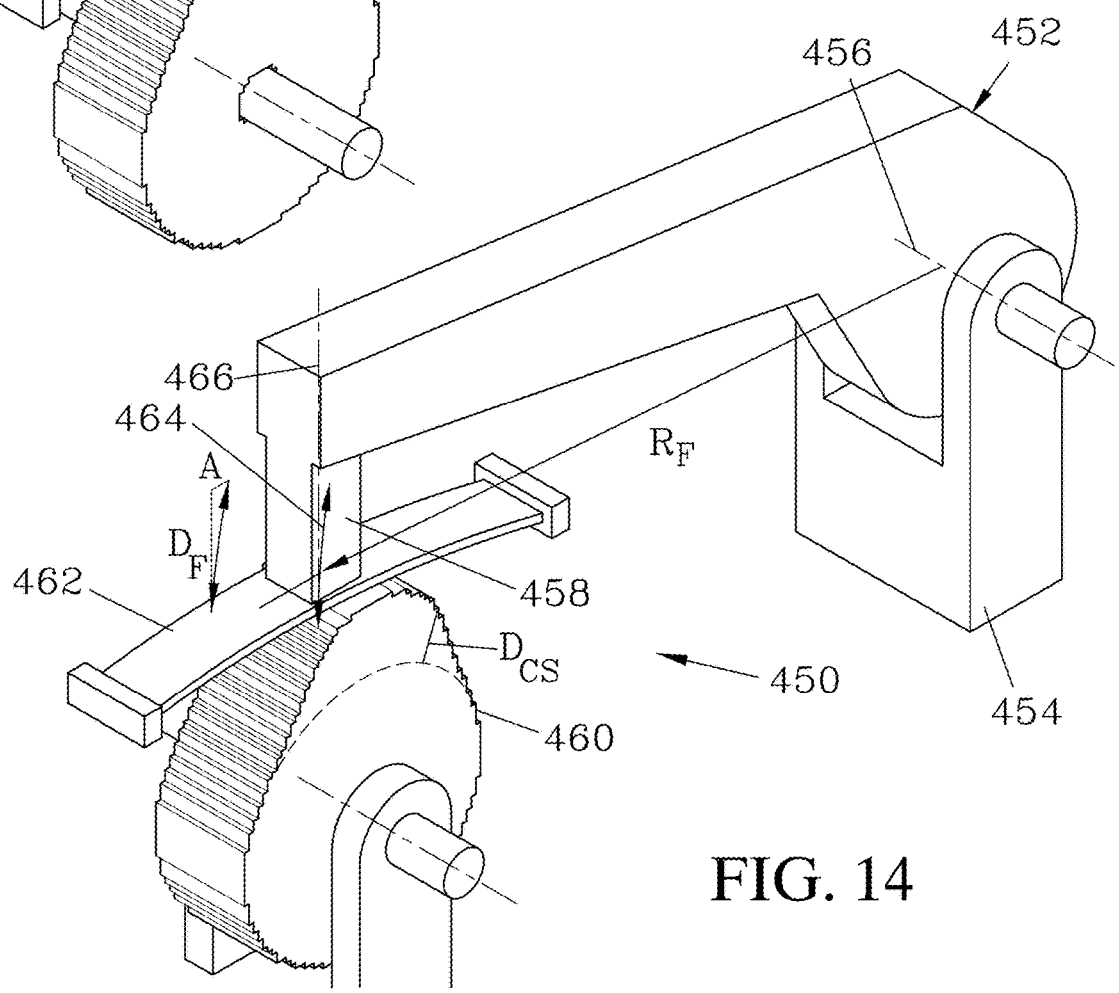
FIG. 14 illustrates a cam assembly having a follower that is pivotably mounted to the frame. A follower contact portion is moved along an arcuate path, where the radius from the pivot axis is large enough relative to the contour of the cam surface that the primary component of motion of the contact portion is perpendicular to the cam axis of rotation, and thus provides an approximation of translational movement.

Cam assemblies such as the examples discussed above can employ a variety of followers to output the displacement transmitted to a follower contact portion from the cam surface via the buffer active region. FIGS. 13 & 14 illustrate two typical examples of followers. FIG. 13 illustrates a cam assembly 400 having a follower 402 (partially shown) that is translatably mounted to a frame 404. The frame 404 has a follower passage 406 that guides the follower 402 in translating along a follower axis 408 as it is displaced by a buffer element 410 which in turn is displaced by motion of a cam surface 412.

FIG. 14 illustrates a cam assembly 450 where a follower 452 is pivotably mounted to a frame 454. The follower 452 pivots about a follower pivot axis 456, allowing a follower contact portion 458 to be displaced by movement of a cam surface 460, transmitted to the follower contact portion 458 via a buffer element 462. The follower contact portion 458 is displaced along an arcuate path 464 about the follower pivot axis 456. The follower 452 can be configured such that the radius RE of the arcuate path 464 from the follower pivot axis 456 is large relative to the radial displacement Dcs of the cam surface 460, such that the resulting motion of the follower contact portion 358 has a corresponding component of motion DE along a follower displacement axis 466 that is significantly larger than a component of motion A that is perpendicular to the follower displacement axis 466. With such configuration, the displacement of the follower contact portion 458 is a close approximation to translational movement along the follower displacement axis 466.

FIGS. 15 and 16 illustrate one simple example of a cam assembly 500 that is employed to generate a clock signal for a mechanical computing mechanism 502, a portion of which is shown in FIG. 16. The assembly 500 employs a rotating cam 504 with a cam surface 506 that is contoured to provide a displacement waveform with dwell periods, where a follower 508 remains for a time at one of two positions. To provide such an output, the cam surface 506 has an idealized contour 510 (shown in FIG. 15) with dwell time segments (512, 514) that are arcs with two different radii (R1, R2), connected by transition segments 516. With this contour 510, the follower 508 is moved (during the transition segments 516) between two different positions, with a dwell time at each defined by the angular length of arc of the corresponding segment (512, 514) (assuming a constant rotation speed of the cam 504; in some cases, a cam having a non-uniform speed of motion could be employed). A flexible buffer element 518 is interposed between the cam surface 506 and the follower 508 to decrease irregularities in the output waveform. As shown in FIG. 16, the follower 508 is in turn connected to a balance member 520 of a lock-and-balance structure 522 that forms a part of a logic circuit (similar lock-and-balance structures are shown in FIGS. 22-28*b* of U.S. Publication 2017/0192748, and related publications (Merkle, Freitas et al., "Molecular Mechanical Computing Systems," Institute for Molecular Manufacturing, 2016; "Mechanical computing systems using only links and rotary joints," ASME Journal on Mechanisms and Robotics, 2018), all incorporated herein by reference). While a simple, direct pivotable connection to a single balance member is shown for purposes of illustration, it should be appreciated by one skilled in the art that more complex connection schemes may be employed, and may be designed to provide a clock signal distributed to multiple elements, and/or clock signals which provide displacements to different elements at different phases in the clock cycle. For example, a single cam could have multiple followers, so that one cam can run a multi-phase clocking system (one example is discussed below with reference to FIGS. 21 & 22).

As shown in FIG. 16, the cam 504 is at a position in its rotation where the cam surface 506 is positioned with its larger radius (R2) arc segment 514 engaging the buffer element 518. While the segment 514 engages the buffer element 518, the displacement transmitted to the follower 508 positions the follower 508 at an extended position as shown, where it pushes the balance member 520. The lock-and-balance structure 522 is configured such that one of two lock assemblies (524, 526) is immobile, while the other is free to move, based on the positions of input members (not shown in FIG. 16). In the situation shown, the lock assembly 524 is locked, leaving the lock assembly 526 free to move, and thus the displacement of the follower 508 causes the balance member 520 to displace the lock assembly 526, while the lock assembly 524 remains in place.

Rotation of the cam 504 eventually brings the cam surface 506 to a position where the buffer element 518 engages one of the transition segments 516, and then the smaller radius (R1) arc segment 512. At this position, the follower 508 is biased to a retracted position (shown in phantom lines in FIG. 16), where the inputs to the lock-and-balance structure 522 can be reset to define which of the lock assemblies (524, 526) is free to move the next time that the follower 508 is moved to its extended position.

Figures 17, 18:
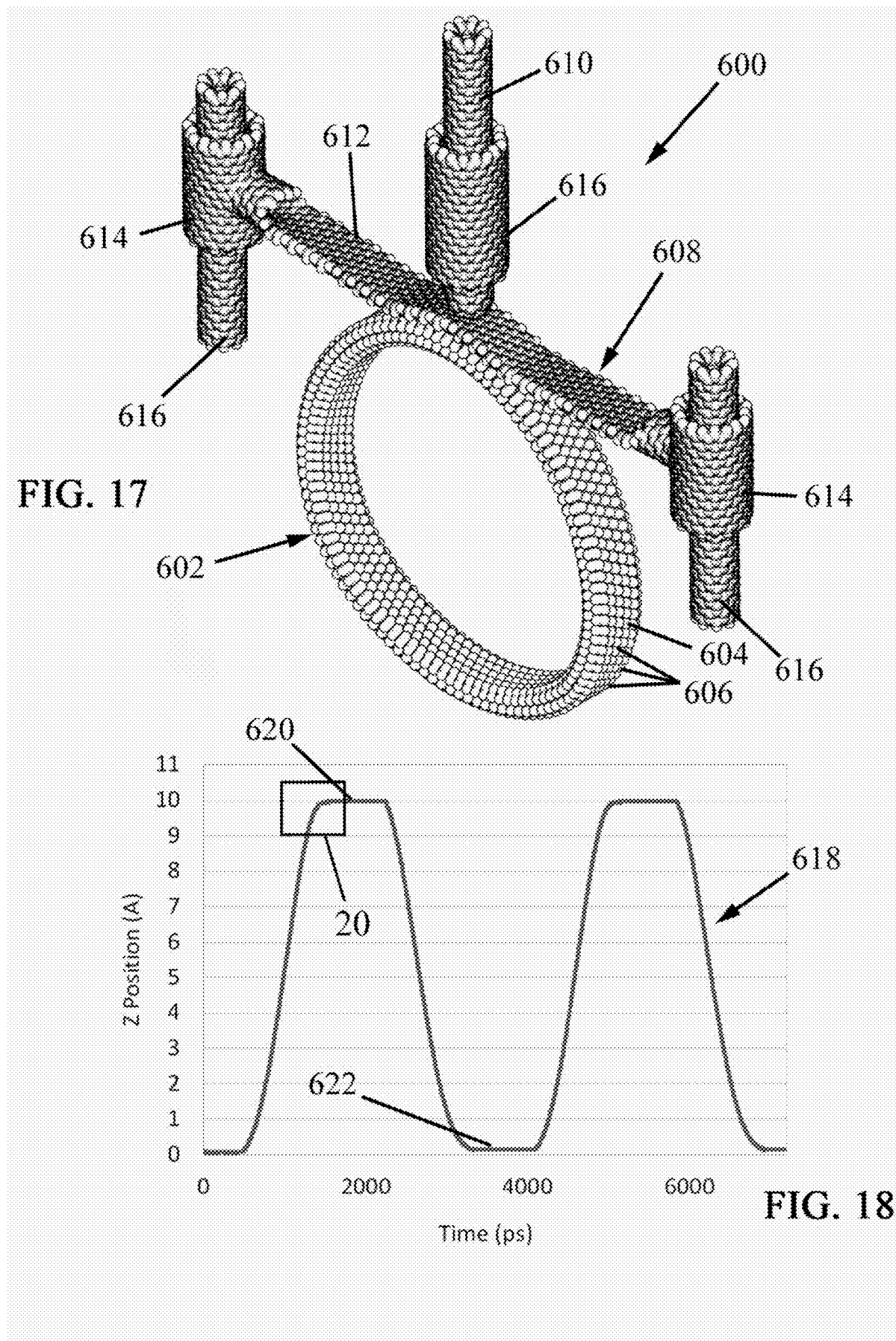
FIG. 17 illustrates a molecular cam model assembly having a cam and follower, and employing a buffer element formed from a sheet of graphene and translatably mounted to a frame. The cam is configured to provide an output waveform with dwell periods in two positions of the follower, in a manner similar to that of the cam assembly shown in FIGS. 15 & 16.
FIG. 18 is a graph of the simulated output waveform that results from the cam and follower shown in FIG. 17. Without magnification to see the noise, this waveform looks almost exactly like the ideal waveform that was desired (the main exception being a slight squaring of some of the corners).

FIG. 17 illustrates a partial molecular model of cam assembly 600 fabricated from individual atoms, such as by mechanosynthesis. The fabrication of atomically-precise structures is taught in U.S. Pat. Nos. 8,171,568; 8,276,211; 9,676,677; 10,067,160; 10,072,031; 10,138,172; 10,197,597; 10,308,514; and 10,309,985, all incorporated herein by reference. The assembly 600 has a cam 602 with a cam surface 604 having an idealized contour similar to that of the cam 504 shown in FIGS. 15 & 16 (note that some structure of the cam 602 is omitted for purposes of illustration). The cam surface 604 has irregularities formed by individual atoms 606. The assembly 600 also has a buffer element 608 that is interposed between the cam surface 604 and a follower 610. The cam 602 and follower 610 can be formed of materials such as diamond and substituted variants thereof, carbon nanotubes and other fullerenes, boron nitride, silicon, silicon carbide, or any other material having the desired stiffness, drag, thermal conductivity, and other properties as would be evident to one skilled in the art. The buffer element 608 has a buffer active region 612, which can be a flexible material such as one or more layers of graphene, bracketed by buffer end regions 614 which can be a rigid material such as diamond or carbon nanotubes (CNTs). The end regions 614 are designed to translatably engage portions of a frame 616, and the follower 610 may also be translatably mounted to the frame 616. In the exemplary molecular model used to generate FIG. 17, the cam 602 is a strained hoop of hexagonal diamond, the buffer active region 612 is a graphene ribbon or sheet, and the buffer end regions 614, the follower 610, and the cylindrical portions the frame 616 that these elements translatably engage are all carbon nanotubes. For the assembly 600 illustrated, where a single sheet of graphene is employed, the buffer active region 612 has a resulting thickness of about 3.5 Å; however, in some cases multiple layers could be employed, as could 3-dimensional materials (e.g., diamond, silicon, silicon nitride, silicon carbide, boron nitride, etc., including layers or mixtures of different substances) and so for typical applications, the buffer active region for use with molecularly-assembled cams and followers could have substantially thicknesses. For example, thicknesses of 1nm, 2 nm, 5 nm, 10 nm, 20 nm or even more would work fine from a practical standpoint; they just may not permit as compact a cam assembly as a thinner buffer element would. At least toward the larger end of this range, one advantage would be that the manufacture of devices with such feature sizes is within the capability of standard integrated circuit manufacturing.

As the cam 602 rotates relative to the frame 616 (note that the rotational mounting structure is not shown), the contour of the cam surface 604 displaces the buffer active region 612 and the follower 610 such that the position of the follower 610 over time defines a waveform 618, as shown in FIG. 18.

The data for the graph of FIG. 18 was generated by using molecular dynamics software to model the behavior of the model in FIG. 17 as the cam rotates. The waveform 618 of FIG. 18 represents the movement of the follower 610 of FIG. 17 over time. Upper dwell period 620 of FIG. 18 represents the upper position of follower 610 of FIG. 17, while lower dwell period 622 of FIG. 18 represents the lower position of follower 610 of FIG. 17. Positions are given in Angstroms and times in picoseconds. Such molecular modeling could be done with GROMACS, LAMMPS, or any of many other well-known software programs in the field.

Additional code to include "motor" forces could be used to drive the cam, or forces could be provided without the need for extra code by, for example, rotating the cam via a pretensioned polymer wrapped around its axle (not shown). The region 20 shown in FIG. 18, where the output waveform rises to the upper dwell position of the follower, is shown enlarged in FIG. 20, and FIG. 19 shows a corresponding portion of output waveform.

Figure 19:
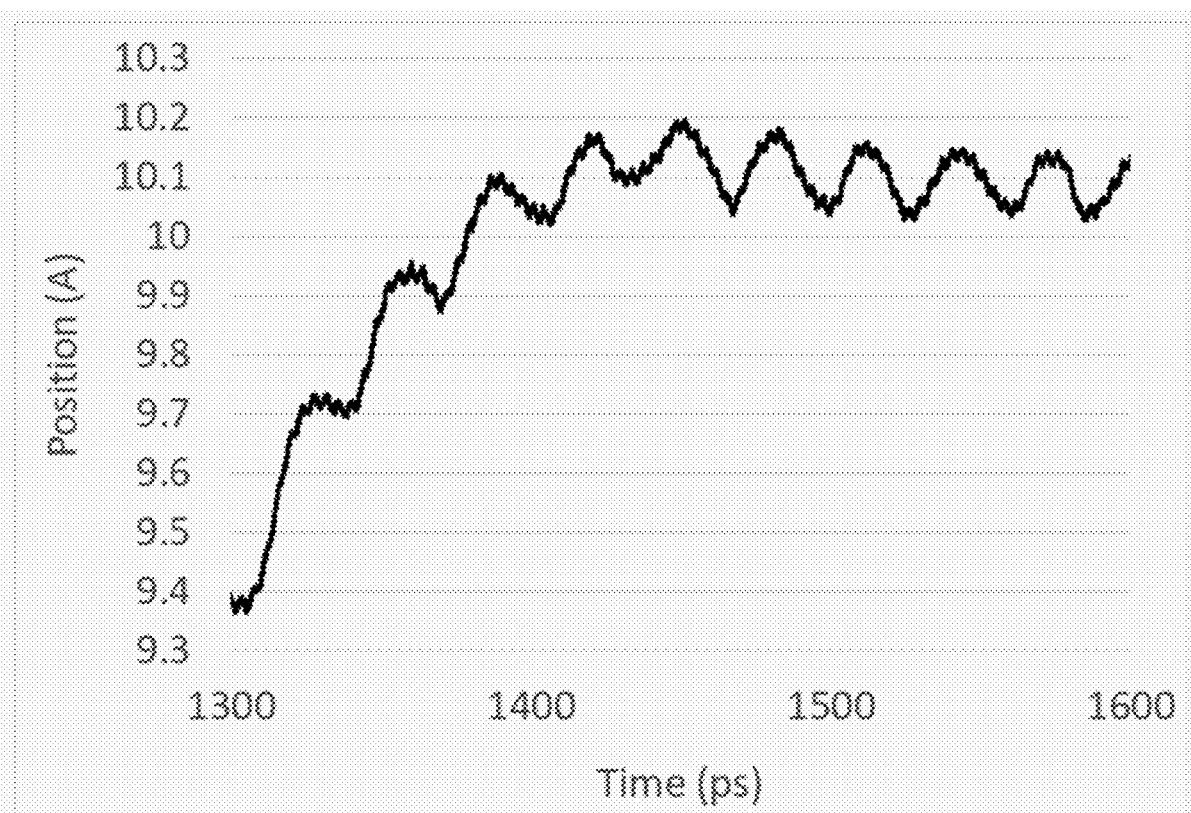
FIG. 19 is an enlarged graph of a waveform output, corresponding to the region 20 shown in FIG. 18, but showing the waveform that would result if the buffer element were not employed.

FIG. 19 is a graph of an enlarged portion of the simulated output waveform that results from using the cam 602 and the follower 610 shown in FIG. 17 without the buffer element 608. The enlarged section of FIG. 19 corresponds to the region 20 shown in FIG. 18. As the graph of FIG. 19 shows, irregularities in the cam surface 604 caused by the atoms 606, shear forces, and vibrations result in a waveform with substantial periodic noise superimposed on the overall waveform.

Figure 20:
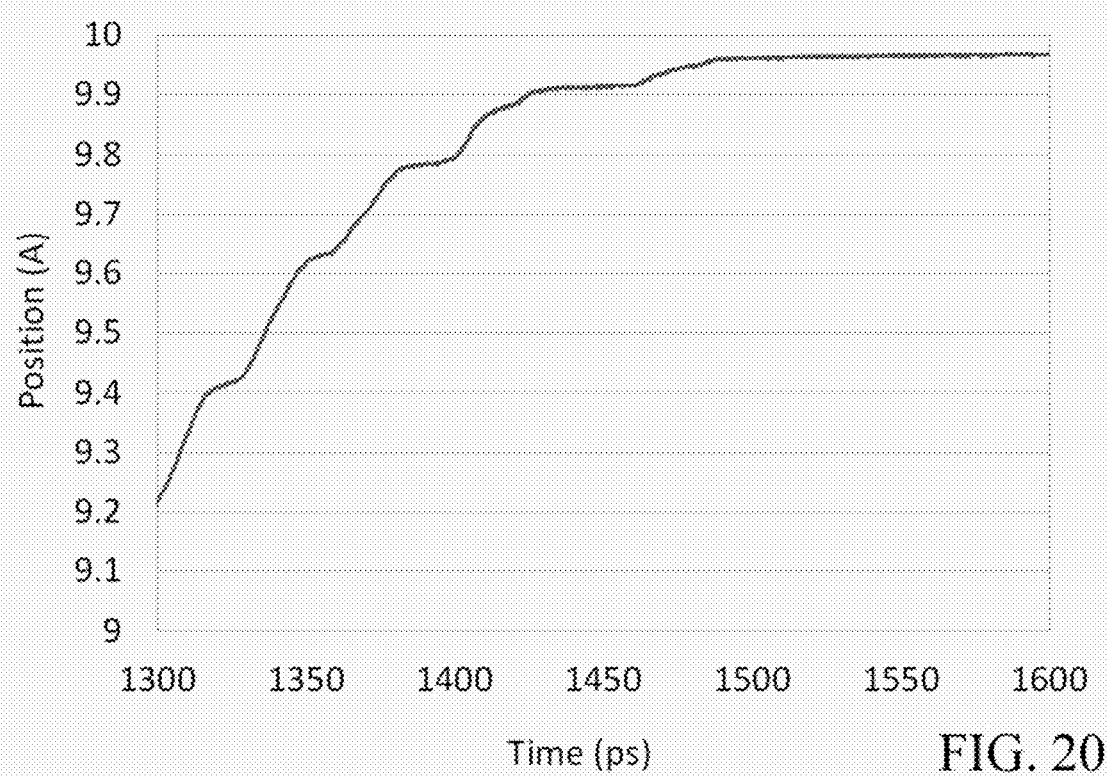
FIG. 20 is an enlarged view of the region 20 of the graph shown in FIG. 18, resulting from the cam assembly shown in FIG. 17, including the buffer element. The buffer element acts to isolate the follower from shear forces and/or the irregularities on the cam surface, resulting in a more accurate output waveform.

FIG. 20 is a graph of the simulated waveform output that results from the cam assembly 600, including the buffer element 608, for the same time period as shown in the graph of FIG. 19 (i.e., the time period indicated by the region 20 in FIG. 18). The buffer element 608 acts to isolate the follower 610 from the cam surface 604, and the resulting output waveform is a more accurate approximation of the ideal waveform.

Figure 21:
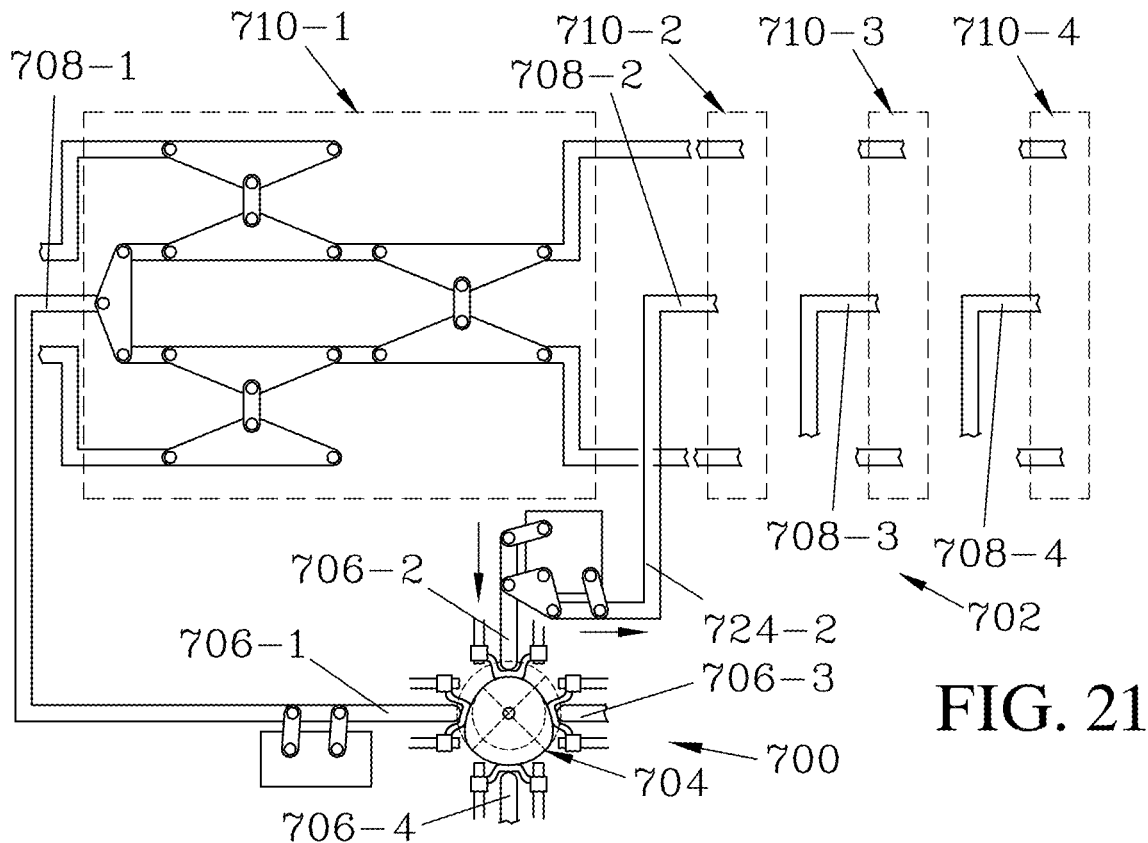
FIGS. 21 and 22 illustrate an example of a buffered cam assembly that serves to provide clock inputs for a mechanical shift register, where the cells are clocked using four different phases. The cam assembly has four followers at four radial positions, each moved by action of a cam transmitted through a buffer element associated with the follower. These four followers provide the four clock phases.
Figure 22:
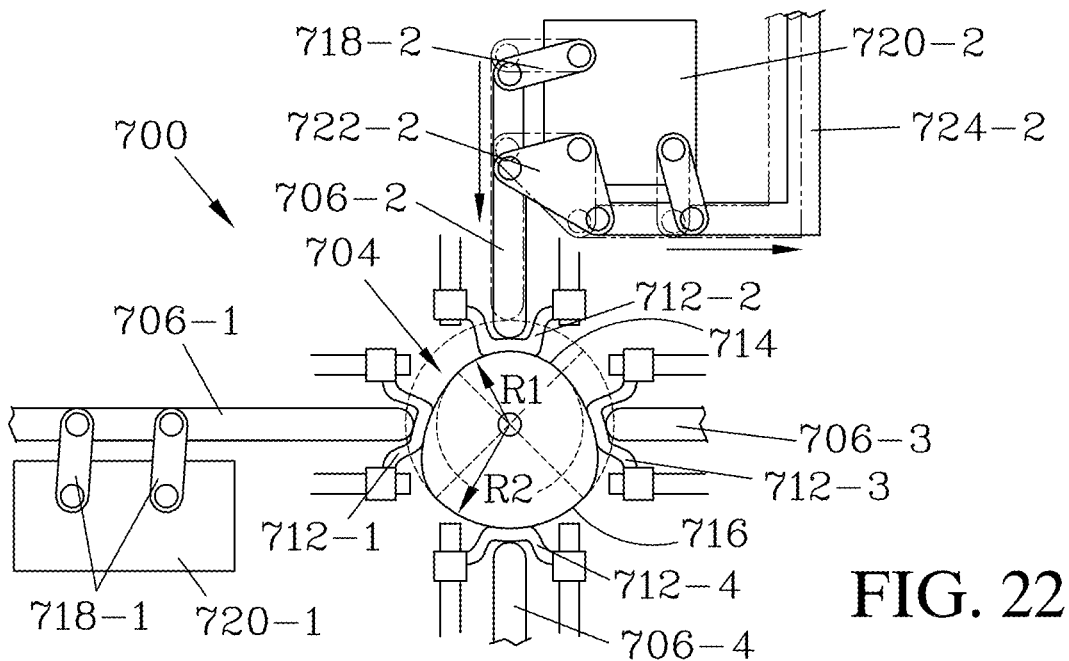

FIGS. 21 and 22 illustrate one example of a 4-phase buffered cam assembly 700, which is shown used to provide clock inputs for a 4-cell shift register 702. The structure shown in FIGS. 21 & 22 shows one example of structure for distributing clock input motion from a cam assembly to components of a mechanical computing system; other structures for transmitting and distributing movement from a cam assembly to various components of a mechanical computing system will be apparent to one skilled in the art.

As better shown in FIG. 22, the cam assembly 700 has a cam 704 that moves four followers (706-1, 706-2, 706-3, & 706-4). Each of the followers (706-1, 706-2, 706-3, & 706-4) is connected to an associated clock input (708-1, 708-2, 708-3, & 708-4) of a shift register cell (710-1, 710-2, 710-3, & 710-4), as shown in FIG. 21. The shift register cells (710-1, 710-2, 710-3, & 710-4) can function in a manner similar to the shift register cell illustrated in FIGS. 25-27 of U.S. Publication 2017/0192748, incorporated herein by reference (it should be appreciated that other mechanical logic units could similarly be employed). Each follower (706-1, 706-2, 706-3, 706-4) is moved by the cam 704, with the movement being smoothed and transmitted via a buffer element (712-1, 712-2, 712-3, 712-4).

The cam 704 shown in this example is shaped similarly to the cams 504 and 602 shown in FIGS. 15-17, having surface arc segments (714, 716) having two different radii (R1, R2). Thus, the cam 704 moves the followers (706-1, 706-2, 706-3, 706-4) between two positions. The followers (706-1, 706-2, 706-3, 706-4) are positioned at four radial positions about the cam 704, and thus are moved to advance the associated clock input (708-1, 708-2, 708-3, 708-4) at four different phases as the cam 704 rotates.

Because the followers (706-1, 706-2, 706-3, 706-4) are positioned to move in different directions as they move towards and away from the axis of rotation of the cam 704, the direction of the movement may need to be redirected to move the associated clock input (708-1, 708-2, 708-3, 708-4) in the appropriate direction. For example, when the follower 706-1 engages the surface arc segment 714 having smaller radius R1, it moves inwards (to the right as shown in FIGS. 21 & 22), and since it is directly connected to the clock input 708-1, the clock input 708-1 also moves to the right, pushing and moving whichever elements of the cell 710-1 are not currently locked. In this example, the follower 706-1 is stabilized in its movement by parallel pivot links 718-1 that are mounted to an anchor block 720-1. In comparison, the follower 706-2 is positioned vertically, and when it engages the arc segment 714 it moves downward, but the clock input 708-2 is positioned to be pushed to the right (the same direction as clock input 708-1); thus, in this case the direction of motion must be changed. To redirect the motion in this example, the follower 706-2 is mounted to an anchor block 720-2 by a pivot link 718-2, but also by a pivot member 722-2, which is also pivotably connected to a clock input extension 724-2, and arranged such that pivoting of the pivot member 722-2 caused by downward motion of the follower 706-2 acts to move the clock input extension 724-2 to the right. The clock input extension 724-2 is in turn directly connected to the clock input 708-2, and moves it to the right to push and move whichever elements of the cell 710-2 are not locked. While not shown, similar motion-redirecting structures can be employed to connect the followers 706-3 and 706-4 to their respective clock inputs 708-3 and 708-4, so that in each case, radial inward movement of the follower (706-1, 706-2, 706-3, 706-4) as its associated buffer element (712-1, 712-2, 712-3, 712-4) comes into engagement with the smaller-radius surface arc segment 714 causes the associated clock input (708-1, 708-2, 708-3, 708-4) to move to the right. Similarly, radial outward movement of the follower (706-1, 706-2, 706-3, 706-4) when its associated buffer element (712-1, 712-2, 712-3, 712-4) comes into engagement with the larger-radius surface arc segment 716 causes the associated clock input (708-1, 708-2, 708-3, 708-4) to move to the left. It should be appreciated by those skilled in the art that further connection and/or linkage schemes could be employed to transmit motion of one or more followers to multiple elements and/or in multiple directions. Similarly, while the example shown in FIGS. 21 & 22 shows a case where two positions of each follower are shown, as suitable for providing binary logic functions, one skilled in the art should appreciate that trinary, quaternary, or further multi-state logic mechanisms could be employed with the appropriate configuration of the cam and related elements.

FIGS. 23a through 23d illustrate another example, where a clock assembly 750 is shown used to provide a clock input 752 for a mechanical computing device, in this example a mechanical link logic NOR gate 754. The NOR gate 754 has first and second input members 756 and 758, and first and second balance members 760 and 762. The clock assembly 750 has a moving cam that controls the motion of a follower via a buffer element, in the manner of the cam assemblies discussed herein. The follower in turn is connected to or formed integrally with the clock input 752, which is connected to push on the first balance member 760. Depending on the position of the first input member 756, such movement is either transmitted to the second balance member 762 by a gate line 764 (when the first input member 756 is in its 0 position, as shown in FIGS. 23a and 23c, with the motion of the first balance member 760 indicated by the dashed arrow under the gate line 764), or the first balance member 760 moves such that it does not move the gate line 764 (when the first input member 756 is in its 1 position, as shown in FIGS. 23b and 23d, with the motion of the first balance member 760 indicated by the dashed arrow spaced apart from the gate line 764). Similarly, based on the position of the second input member 758, the second balance member 762 moves in response to the movement of the gate line 764 to either transmit the motion to an output line 766 (when the second input member 758 is in its 0 position, as shown in FIG. 23a, with the motion of the second balance member 762 indicated by the dashed arrow under the output line 766) or moves so as to not move the output line 766 (when the second input member 758 is in its 1 position, as shown in FIG. 23c, with the motion of the second balance member 762 indicated by the dashed arrow spaced apart from the output line 766). Thus, movement of the clock input 752 is only transmitted to the output line 766 when both input elements 756 and 758 are in their 0 positions (as shown in FIG. 23a).

Figure 24:
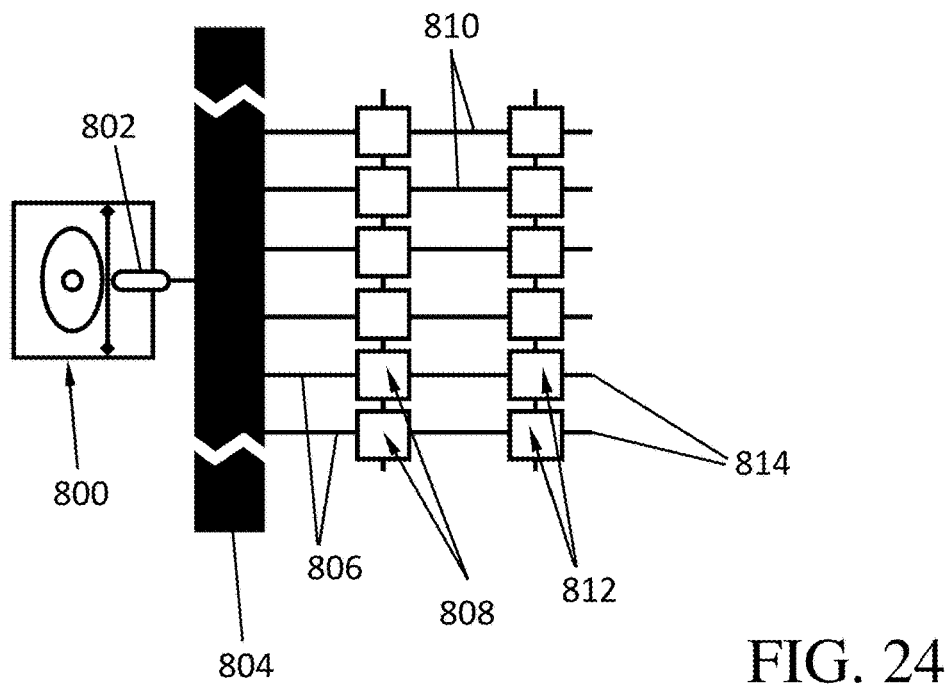
FIG. 24 is a schematic view of a cam assembly connected to serve as a clock input for a mechanical computing system, where the follower of the cam assembly provides the clock input for a series of mechanical computing units.

FIG. 24 is a schematic view illustrating a single cam assembly 800 serving as a clock. The cam assembly 800 has an output follower 802 that moves a bus 804 that, in turn, is connected to the 1st-level clock inputs 806 of a series of 1st-level mechanical logic units 808 (which could be, for example, logic gates or memory cells). Based on the positions of inputs, each of the 1st-level logic units 808 either transmits (for logic output 1) or does not transmit (for logic output 0) the movement through a 1st-level output 810, with the 1st-level outputs 810 serving as inputs for a series of 2nd-level mechanical logic units 812. The 2nd-level logic units 812 similarly either transmit or do not transmit such movement (depending on the positions of their inputs and their designed logic function) to 2nd-level outputs 814. Note that, while not shown as multiple lines to keep the diagram simple, all clocked logic would have a clock line, and so data outputs 810 could also be assumed to include a clock signal (likely of a different phase) to 2nd-level logic units 812, just as clock inputs 806 provide a clock signal for 1st-level logic units 808. While not shown, further levels of logic could be added to provide sufficient computational and memory functions for the desired computational capability. In general, any number of computing elements could be present, connected in any manner.

Note that while the system of FIG. 24 is described as either transmitting (output 1) or not transmitting (output 0) the motion, this notation is arbitrary and could easily be reversed. Further, some mechanical computing systems have both a 0-ouptut line and a 1-ouput line, the respective line moving to signal that value. In general, many different implementations of mechanical logic and memory are known, as are many different clocking schemes, and FIG. 24 is intended to conceptually represent any arrangement of one or more clocks providing clock signals to one or more mechanical computing elements which would be apparent to those skilled in the art.

Figure 25:
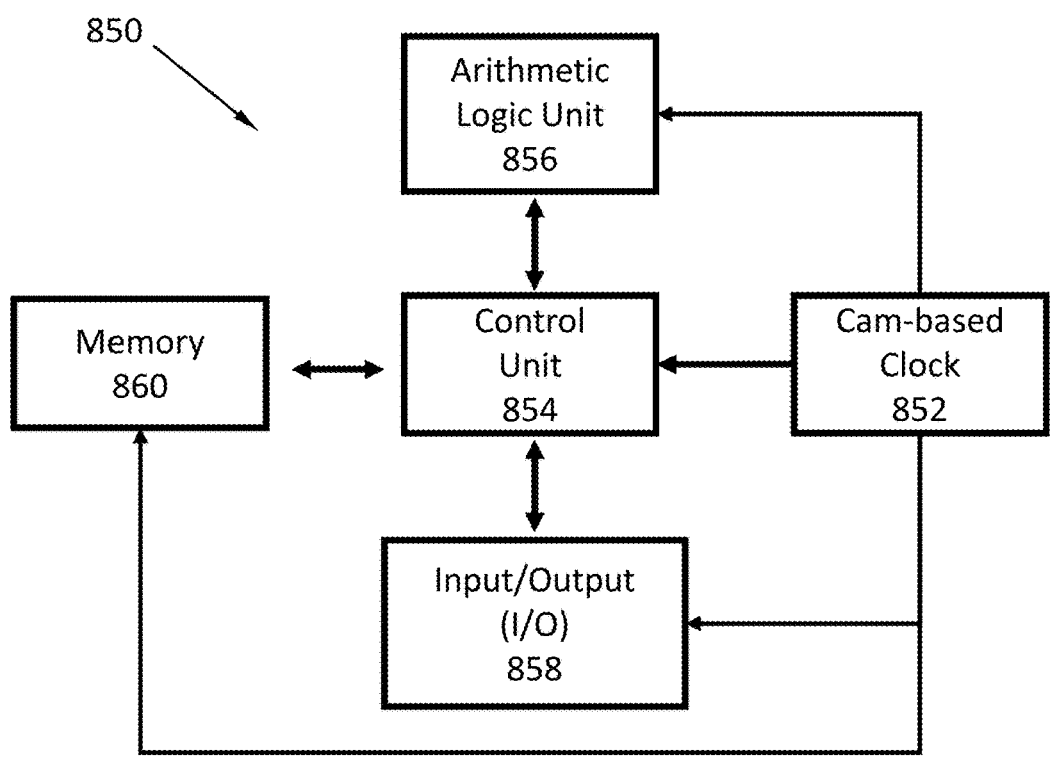
FIG. 25 is a schematic view of a computer system that includes a cam-based clock to provide one or more clock inputs for at least some of the computer's components.

FIG. 25 is a schematic view illustrating a mechanical computing system 850 where clock inputs are provided by a cam-based clock 852, which employs one or more followers and associated buffer elements to provide a smooth clock signal with a desired waveform. The system 850 shown employs the well-known Harvard Architecture; many alternative computer system architectures are well-known to those skilled in the art. Similarly, while a single clock 852 is shown, multiple clocks could be employed, and could be either synchronized or, in some cases, operate asynchronously. Similarly, the clock(s) could receive input from the other computer components such that the timing is dependent on logic operations performed. The clock 852 illustrated provides input forces that are distributed to move logic elements within a control unit 854, an arithmetic logic unit 856, an input/output interface 858, and a memory 860. It should be appreciated that it is possible to have a hybrid electro-mechanical computer; for example, it is possible that the cam-based clock does not need to supply a clock input to all components because some could have their inputs handled electronically. Examples of mechanical and hybrid mechanical/electrical computing systems are well-known in the art, such as Babbage's Difference Engine and Analytical Engine, and Conrad Zeus's Z3 electro-mechanical computing system, as well as subsequent computing systems that, at least in part, employ the positions of mechanical elements rather than electronic voltages to perform logic and/or store data.

Although the present invention is described with reference to particular examples, other methods, systems, and devices are possible for obtaining the benefit of the present invention. Accordingly, the spirit and scope of the appended claims should not be limited to the description of the particular examples contained herein.

BIBLIOGRAPHY

Merkle, R., Freitas, R., et al., (2016), "Molecular Mechanical Computing Systems," Institute for Molecular Manufacturing.
Merkle, R., Freitas, R., et al. (2018), "Mechanical computing systems using only links and rotary joints", ASME Journal on Mechanisms and Robotics.
Merkle, R., Freitas, R., et al., (2015), US Patent Application 20170192748, "Mechanical Computing Systems".

The invention claimed is:
1. A clock signal generator for a mechanical computing system having a clocking member, the clock signal generator comprising:
   a cam having a cam surface;
   a buffer element engaged with said cam surface; and
   a follower having a follower contact portion positioned to engage said buffer element and connected to the clocking member of the mechanical computing system,
      said cam surface being configured relative to said follower such that relative motion between said cam surface and said follower causes relative displacement of said follower, transmitted from said cam surface via said buffer element, such relative displacement of said follower acting to move the clocking member of the mechanical computing system,
      said cam surface being configured such that relative displacement of said follower generates a clock signal output waveform for the clocking member.
2. The clock signal generator of claim 1 wherein said buffer element has a buffer active region interposed between said cam surface and [a] said follower contact portion of said follower, wherein said buffer active region is restrained from moving in the direction of the relative motion of said cam surface with respect to said follower.

3. The clock signal generator of claim 2 wherein said buffer active region is formed from a material having a higher wear rate than said cam surface or said follower contact portion.

4. The clock signal generator of claim 2 further comprising:
a frame to which said cam is movably mounted, wherein said buffer element is translatably mounted with respect to said frame.

5. The clock signal generator of claim 2 further comprising:
a frame to which said cam is movably mounted, wherein said buffer element is pivotably mounted with respect to said frame.

6. The clock signal generator of claim 2 wherein said cam surface is configured to position said follower contact portion at a constant position for at least one dwell period.

7. The clock signal generator of claim 1 wherein said buffer active region is formed from a material that to has a higher wear rate than said cam surface or said follower contact portion.

8. The clock signal generator of claim 1 wherein at least a portion of said buffer element is rigid and said buffer element is movably mounted with respect to a frame to which said cam is movably mounted.

9. The clock signal generator of claim 8 wherein said buffer element is translatably mounted with respect to said frame.

10. The clock signal generator of claim 8 wherein said buffer element is pivotably mounted with respect to said frame.

11. The clock signal generator of claim 1 wherein at least a portion of said buffer element is flexible.

12. The clock signal generator of claim 11 wherein said buffer element is movably mounted with respect to a frame to which said cam is movably mounted.

13. The clock signal generator of claim 1 wherein said buffer active region is elastically movable with respect to a frame to which said cam is movably mounted.

14. The clock signal generator of claim 1 wherein said buffer active region is compressible.

15. The clock signal generator of claim 1 wherein said cam surface is configured to position said follower contact portion at a constant position for at least one dwell period.

16. A buffered cam assembly comprising:
a cam having a contoured cam surface;
a buffer element having a buffer active region that contacts said cam surface; and
a follower having a follower contact portion that is positioned to contact said buffer active region so as to be displaced by displacement of said buffer active region caused by the contour of said cam surface as said cam moves relative to said follower,
wherein said buffer active region is no more than 20 nm thick where it is engaged by said follower contact portion.

17. A method for reducing inaccuracies in the output of a follower of a cam assembly also having a cam, the method comprising the steps of:
interposing a buffer active region of a buffer element between a follower contact portion of the follower and a cam surface of the cam, such that the buffer active region is displaced by motion of the cam surface relative to the follower contact portion and transmits such displacement to the follower contact portion;
causing the cam surface to move relative to the follower contact portion; and
using the follower to provide at least one clock signal for a mechanical computing system.

\* \* \* \* \*